(12) United States Patent
Lin et al.

(10) Patent No.: US 10,010,876 B2
(45) Date of Patent: Jul. 3, 2018

(54) CATALYST FOR HIGH TEMPERATURE STEAM REFORMING

(71) Applicants: Jiefeng Lin, Rochester, NY (US); Gervase Maxwell Christie, Amherst, NY (US)

(72) Inventors: Jiefeng Lin, Rochester, NY (US); Gervase Maxwell Christie, Amherst, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 0 days.

(21) Appl. No.: 15/359,986

(22) Filed: Nov. 23, 2016

(65) Prior Publication Data

US 2018/0141028 A1    May 24, 2018

(51) Int. Cl.
  *B01J 23/755* (2006.01)
  *B01J 23/83* (2006.01)
  (Continued)

(52) U.S. Cl.
  CPC ............. *B01J 23/894* (2013.01); *B01J 23/83* (2013.01); *B01J 35/1014* (2013.01);
  (Continued)

(58) Field of Classification Search
  CPC ........ B01J 23/755; B01J 23/83; B01J 23/892; B01J 23/894; B01J 35/1014;
  (Continued)

(56) References Cited

U.S. PATENT DOCUMENTS

| 3,436,358 A | * | 4/1969 | Thygesen | ............. B01J 23/005 423/654 |
| 4,055,513 A | * | 10/1977 | Wheelock | ............. B01J 21/005 502/303 |

(Continued)

FOREIGN PATENT DOCUMENTS

| EP | 1930076 A1 | 6/2008 |
| EP | 2 098 491 A1 | 9/2009 |

(Continued)

OTHER PUBLICATIONS

R.B. Duarte, O.V. Safonova, F. Krumeich, M. Makosch, and J.A. van Bokhoven, "Oxidation State of Ce in CeO2-Promoted Rh/Al2O3 Catalysts during Methane Steam Reforming: H2O Activation and Alumina Stabilzation", ACS Catalysis 2013, vol. 3, pp. 1956-1964.

(Continued)

*Primary Examiner* — Cam N. Nguyen
(74) *Attorney, Agent, or Firm* — Ralph J. Mancini

(57) ABSTRACT

This invention relates to highly active and stable catalyst composite used in high temperature synthesis gas production. More specifically, nickel alumina catalysts doped with noble metals and lanthanide groups or transition metal groups containing a lattice spinel structure with a general formula $[Ni_xA_{1-x}][(B_yAl_{1-y})_2]O_4$. Stabilizers such as yttria-stabilized zirconia are also integrated in this composite to enhance high temperature catalytic performance. The catalyst composite of present invention exhibits high redox tolerance, coking resistance, high temperature stability, and high catalytic activity.

29 Claims, 5 Drawing Sheets

(51) Int. Cl.
  *B01J 23/89* (2006.01)
  *B01J 35/10* (2006.01)
  *B01J 37/03* (2006.01)
  *B01J 37/04* (2006.01)
  *B01J 37/08* (2006.01)

(52) U.S. Cl.
  CPC ....... *B01J 35/1019* (2013.01); *B01J 35/1023* (2013.01); *B01J 35/1028* (2013.01); *B01J 37/031* (2013.01); *B01J 37/04* (2013.01); *B01J 37/08* (2013.01)

(58) Field of Classification Search
  CPC ................ B01J 35/1019; B01J 35/1023; B01J 35/1028; B01J 37/031; B01J 37/04; B01J 37/08
  See application file for complete search history.

(56) References Cited

U.S. PATENT DOCUMENTS

| | | | |
|---|---|---|---|
| 4,233,186 A * | 11/1980 | Duprez | B01J 23/74 502/327 |
| 4,261,862 A * | 4/1981 | Kinoshita | B01D 53/945 423/213.5 |
| 4,274,981 A * | 6/1981 | Suzuki | B01D 53/945 423/213.5 |
| 4,285,837 A * | 8/1981 | Sato | B01J 23/755 423/654 |
| 4,456,703 A | 6/1984 | Aldridge | |
| 4,985,387 A * | 1/1991 | Prigent | B01D 53/945 423/213.5 |
| 5,105,044 A | 4/1992 | Han et al. | |
| 5,399,537 A * | 3/1995 | Bhattacharyya | B01J 23/005 423/592.1 |
| 5,439,861 A * | 8/1995 | Bhattacharyya | B01J 23/005 502/74 |
| 5,653,774 A * | 8/1997 | Bhattacharyya | B01J 23/005 423/594.1 |
| 5,736,114 A * | 4/1998 | Barthe | B01D 53/9418 423/213.2 |
| 5,885,917 A * | 3/1999 | Ohdan | B01J 23/005 423/600 |
| 6,143,916 A | 11/2000 | Hinago et al. | |
| 6,268,075 B1 | 7/2001 | Autenrieth et al. | |
| 6,402,156 B1 | 6/2002 | Schutz et al. | |
| 6,409,940 B1 | 6/2002 | Gaffney et al. | |
| 6,416,731 B1 * | 7/2002 | Dohrup | B01J 21/005 252/373 |
| 6,693,060 B2 | 2/2004 | Park et al. | |
| 7,097,786 B2 | 8/2006 | Dindi et al. | |
| 8,206,576 B2 | 6/2012 | Moon et al. | |
| 8,268,289 B2 * | 9/2012 | Takahashi | B01J 23/892 423/651 |
| 9,168,510 B2 | 10/2015 | Lee et al. | |
| 9,259,712 B2 | 2/2016 | Schwab et al. | |
| 2004/0135324 A1 | 7/2004 | Brule et al. | |
| 2006/0019827 A1 | 1/2006 | Whittenberger | |
| 2006/0029539 A1 | 2/2006 | Dutta et al. | |
| 2006/0063659 A1 | 3/2006 | Xue et al. | |
| 2007/0245897 A1 | 10/2007 | Besecker et al. | |
| 2008/0142148 A1 | 6/2008 | Nielsen et al. | |
| 2009/0272943 A1 | 11/2009 | Chartier et al. | |
| 2010/0018394 A1 | 1/2010 | Ekiner et al. | |
| 2010/0203238 A1 | 8/2010 | Magno et al. | |
| 2010/0304236 A1 | 12/2010 | Ying et al. | |
| 2012/0067210 A1 | 3/2012 | Sane et al. | |
| 2012/0273728 A1 | 11/2012 | Abatzoglou et al. | |
| 2013/0258000 A1 | 10/2013 | Ohashi et al. | |
| 2014/0231351 A1 | 8/2014 | Wickramasinghe et al. | |
| 2015/0096506 A1 | 4/2015 | Kelly et al. | |
| 2016/0001221 A1 | 1/2016 | Lu et al. | |
| 2016/0118188 A1 | 4/2016 | Wada | |
| 2016/0155570 A1 | 6/2016 | Shimada et al. | |

FOREIGN PATENT DOCUMENTS

| | | |
|---|---|---|
| GB | 2016298 A | 9/1979 |
| WO | WO 2004/063110 A2 | 7/2004 |
| WO | WO 2006/064160 A1 | 6/2006 |
| WO | 2012/067505 A2 | 5/2012 |
| WO | WO 2014/049119 A1 | 4/2014 |
| WO | WO 2014/160948 A1 | 10/2014 |

OTHER PUBLICATIONS

T.F. Silva, J.A.C. Dias, C.G. Maciel, and J.M. Assaf, "Ni/Al2O3 Catalysts: Effects of the Promoters Ce, La and Zr on the Methane Steam and Oxidative Reforming Reactions", Catalysis Science & Technology, 2013, vol. 3, pp. 635-643.

X. Niu, L. Zhou, X. Hu, and W. Han, "Mesoporous CexCo1-xCr2O4 Spinels: Synthesis, Characterization and Catalytic Application in Simultaneous Removal of Soot Particulate and NO", RSC Advances, 2015, vol. 5, pp. 52595-52601.

R. Thirunakaran, A. Sivashanmugam, S. Gopukumar, R. Rajalakshmi, "Cerium and Zinc: Dual-Doped LiMn2O4 Spinels as Cathode Material for Use in Lithium Rechargeable Batteries", Journal of Power Sources, 2009, vol. 187, pp. 565-574.

M.M. Hasan, S. Dey, N. Nafsin, J. Mardinly, P.P. Dholabhai, B.P. Uberuaga, and R.H.R. Castro, "Improving the Thermodynamic Stability of Aluminate Spinel Nanoparticles with Rare Earths", CM Chemistry of Materials, 2016, vol. 28, pp. 5163-5171.

M.H.A. Shiraz, M. Rezaei, and F. Meshkani, "Ni Catalysts Supported on Nano-Crystalline Aluminum Oxide Prepared by a Microemulsion Method for Dry Reforming Reaction", Res. Chem. Intermed. 2016, vol. 42, pp. 6627-6642.

H.F. Rase, "Handbook of Commercial Catalysts: Heterogeneous Catalysts", pp. 186-188.

K.Y. Koo, H. Roh, Y.T. Seo, D.J. Seo, W.L. Yoon, and S.B. Park, "A Highly Effective and Stable Nano-Sized Ni/MgO-Al2O3 Catalyst for Gas to Liquids (GTL) Process", International Journal of Hydrogen Energy, Apr. 2008, vol. 33, pp. 2036-2043.

Jian-jun Liu, Tong Liu, Wen-dong Wang, Jian-feng Gao, Chu-sheng Chen; Zr0.84Y0.16O1.92-La0.8Sr0.2Cr0.5Fe0.5O3-δ dual-phase composite hollow fiber membrane targeting chemical reactor applications; Journal of Membrane Science 389 (2012) 435-440.

M. Solvang, K.A. Nielsen, and P.H. Larsen, "Optimization of Glass Ceramic Sealant for Intermediate Temperature Solid Oxide Fuel Cells", Jan. 1, 2005, XP055352985, Retrieved from the Internet: URL:http://ma.ecsdl.org/content/MA2005-/01/30/1206.full.pdf on Mar. 8, 2017.

VDM Crofer et al., "Material Data Sheet No. 4046 May 2010 Edition", Jan. 1, 2010, XP055353076, Retrieved from the Internet: URL:http://www.vdm-metals.com/fileadmin/user_upload/Downloads/Data_Sheets/ Data_Sheet_VDM_Crofer_22_APU.pdf retrieved on Mar. 9, 2017.

Yulia Hilli, et al.; "Sulfur adsorption and release properties of bimetallic Pd—Ni supported catalysts"; Journal of Molecular Catalysis A: Chemical, vol. 48, Jul. 28, 2015, pp. 161-171, XP029261263.

Magali Ferrandon, et al.; "Bimetallic Ni—Rh catalysts with low amounts of Rh for the steam and autothermal peforming of η-butane for fuel cell applications"; Applied Catalysis A: General, Elsevier, Amsterdam, NL, vol. 379, No. 1-2, May 15, 2010, pp. 121-128, XP027013168.

M. Boaro, et al.; "Comparison between Ni—Rh/gadolinia doped ceria catalysts in reforming of propane for anode implementations in intermediate solid oxide fuel cells"; Journal of Power Sources, Elsevier SA, CH, vol. 195, No. 2, Jan. 15, 2010, pp. 649-661, XP026640152.

* cited by examiner

US 10,010,876 B2

CATALYST FOR HIGH TEMPERATURE STEAM REFORMING

U.S. GOVERNMENT RIGHTS

The invention disclosed and claimed herein was made with United States Government support under Cooperative Agreement number DE-FE0023543 awarded by the U.S. Department of Energy. The United States Government has certain rights in this invention.

FIELD OF THE INVENTION

The present invention relates to highly active and stable catalysts that can be used in high temperature synthesis gas production.

BACKGROUND OF THE INVENTION

Catalytic steam reforming technology has been widely applied for synthesis gas production from hydrocarbon containing feedstocks such as natural gas. Conventional steam methane reformers (SMR) employ tubular reactors packed with reforming catalysts in the form of pellets or structured catalyst packing. The tubular reactors are most commonly vertically mounted in a parallel arrangement in a furnace. Since the steam reforming process is highly endothermic, external heating sources are required. Burners installed within the furnace housing combust natural gas and other fuel sources such as pressure swing adsorption tail gas recycle to support endothermic reactions within the catalyst filled tubes. The heat generated by the burners is transferred by radiation and convection to the reformer tube outer walls, then by conduction from the outer walls to the inner walls, and then by conduction and convection to the reaction mixture in the reformer tube interior. A portion of the heat absorbed by the tubular reactor is utilized to bring natural gas and steam feeds from their feed temperature in a range of about 500° C. to about 550° C. to reaction temperature in a range of from about 650° C. to about 900° C. in order to achieve the desired hydrocarbon conversion.

Typical reforming catalysts are in particulate form and contain active metals such as nickel that are generally deposited on stable ceramic carriers such as alumina supports. In order to achieve close to equilibrium catalytic conversion and high syngas throughput in reforming reactors, catalyst components are designed to be deposited on high surface area ceramic supports, for example, gamma alumina with surface area above 80 m²/g. At high temperatures and under oxidizing conditions such as in the presence of steam or air, the catalytic activity of reforming catalysts can be degraded by vaporization of active metals, agglomeration of metal sites into large clusters which can significantly reduce surface area, encapsulation of metals in collapsed pores due to sintering of ceramic supports, and formation of inactive spinel crystal structures such as $NiAl_2O_4$. Even though high temperature promoters like BaO, $La_2O_3$, and YSZ can be added to alumina supports to slow down spinel structure formation, the formation of spinel is inevitable when catalysts are exposed to high temperatures (above about 750° C.) under oxidative environments (air or steam) for long-periods of time. Additionally, localized hotspots and high reformer tube wall temperatures resulting from reduced catalytic activity can jeopardize the metal alloy reformer tube lifetime. Costs to replace catalyst because of catalyst performance degradation significantly increase overall project costs and decrease plant on-stream time.

High temperature steam purging of the reformer tubes has been considered as a solution for SMR system start-ups, idling and shut-downs as well as coking clean-up. However, $NiAl_2O_4$ spinel formation in the catalyst bed which results after these processes, requires regeneration back to $Ni/Al_2O_3$ at much higher temperatures (e.g., above 1000° C.) whilst the reformer tube is purged with a $H_2$ rich gas stream. A common solution for this problem is to get away from the $Al_2O_3$ catalyst support and use materials such as Yttria-stabilized zirconia (YSZ) which are not prone to $NiAl_2O_4$ formation, however use of such materials significantly sacrifices catalytic surface area and activity in the bed, especially in SMR process.

Accordingly, it is an objective of the invention to develop a reforming catalyst for synthesis gas production having the benefits of high redox tolerance, coking resistance, high temperature stability, and high catalytic activity that is not prone to deactivation by formation of $NiAl_2O_4$ spinel structures at high temperatures under oxidizing conditions. These and other objectives are realized by the novel reforming catalyst of the invention.

SUMMARY OF THE INVENTION

The present invention generally relates to highly active and stable catalysts which can be usefully employed in high temperature synthesis gas production processes, and to a method for making same. More specifically, the invention relates to a catalyst composite containing spinel type crystallites of nickel, aluminum, at least one precious metal, and at least one dopant metal from lanthanide groups or transition metal groups. The invention relates to a catalyst composite containing spinel type structure of formula I:

$$[(Ni)_x(A)_{1-x}][(B)_y(Al)_{1-y}]_2O_4 \qquad (I)$$

wherein:
 A is a first metal dopant selected from the precious metals of Pt, Rh, Ru, Ir, Pd, and Au;
 x is greater than zero but less than 1.0;
 B is a second metal dopant selected from the lanthanide series, or from the transition metals;
 y is greater than zero, but less than about 0.1;
wherein substantially all of the Ni and said second metal (B) in the catalyst composite is part of the spinel lattice structure.

The catalyst of present invention exhibits high redox tolerance, coking resistance, high temperature stability, and high catalytic activity. The invention also relates to a method for making the catalysts of the invention and to a process for producing synthesis gas utilizing the catalysts of the invention.

DETAILED DESCRIPTION OF THE INVENTION

Figure 1:
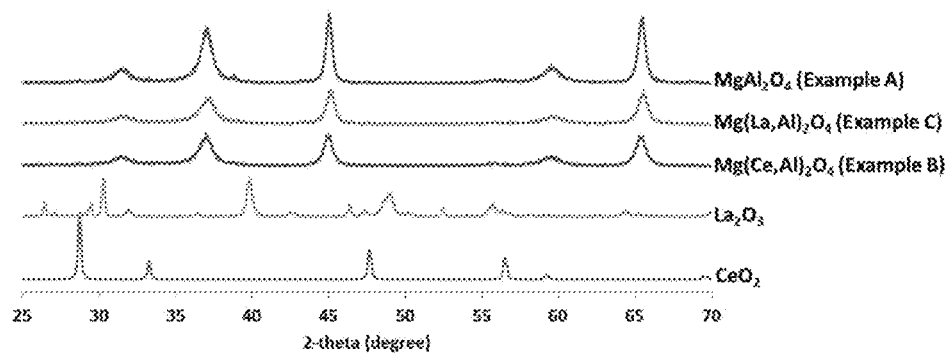
FIG. 1 shows XRD patterns of magnesium aluminate spinel catalyst supports (undoped and doped) prepared in Examples A to C.

The present invention generally relates to an improved catalyst composite containing spinel type of nickel, aluminum and a dopant metal from lanthanide groups or transition metal groups that have smaller crystallite size than spinel type of nickel and aluminum only. More particularly the catalyst composite can contain dopant metal in amounts corresponding to dopant to aluminum atomic ratios of about 0.01:99.99 to about 10:90. A precious metal from the precious metals group such as Pt, Rh, Ru, Ir, Pd, Au can also be integrated into the catalyst in amounts corresponding to atomic ratios of precious metal to nickel in the range of about 0.01:99.99 to about 99.99:0.01, and atomic ratios of precious metal plus nickel to dopant metal plus aluminum of about 5:95 to 35:65. The catalyst composite may also contain stabilizers such as yttria-stabilized zirconia to enhance high temperature catalytic performance.

In one embodiment the present invention relates to a nickel and aluminum containing catalyst composite for reforming hydrocarbons comprising a lattice spinel structure of formula I:

$$[(Ni)_x(A)_{1-x}][(B)_y(Al)_{1-y}]_2O_4 \qquad (I)$$

wherein

A is a first metal dopant selected from the precious metals of Pt, Rh, Ru, Ir, Pd, and Au;

x is greater than zero but less than 1.0;

B is a second metal dopant selected from the lanthanide series, or from the transition metals;

y is greater than zero, but less than about 0.1;

wherein substantially all of the Ni and said second metal (B) is part of the spinel lattice structure.

The catalyst composite may also contain an optional high temperature stabilizer, M, wherein M is an oxide selected from YSZ, stabilized $Al_2O_3$, BaO, CaO, $La_2O_3$, ceria stabilized zirconia, $Sm_2O_3$, perovskite, hexaaluminate, pyrochlore, hydrotalcite, or mixtures thereof.

The term catalyst composite as used herein refers to a catalyst product containing at least the spinel structure of formula I and may also contain a high temperature stabilizer such as M described above.

The term metal dopant integrated in the lattice structure means the metal dopant is or has become part of the lattice structure of formula I.

The terms atomic ratio and molar ratio as used herein are synonymous.

The term absence of peak intensity in a XRD includes peak intensity equivalent to background.

The term ($I_{dopant\text{-}oxide}/I_{spinel}$) peak intensity ratio as used herein refers to the ratio of a peak intensity near Bragg's angle 2-theta characteristic of dopant metal oxide to that of a peak intensity near Bragg's angle 2-theta characteristic of lattice spinel structure of formula I in the XRD pattern of a catalyst composite. For example when the dopant metal is cerium then the ratio is calculated using the peak intensity near 2-theta of 28.7±0.30 (characteristic of $CeO_2$) and the peak intensity near 2-theta of 37.2±0.30 (characteristic of lattice spinel structure). A value of zero indicates all of the dopant metal is part of the lattice spinel structure, and a value greater than zero indicates at least a portion of dopant metal is present as an oxide.

The term ratio ($I_{spinel}/I_{spinel+Al2O3}$) of peak intensity as used herein refers to the ratio of the XRD peak intensity near 2-theta of 37.2±0.30 (characteristic of lattice spinel structure) to the XRD peak intensity near 2-theta of 65.7±0.30 (characteristic of γ -aluminum oxide) that overlaps a minor peak of spinel. A value less than 2 indicates at least a portion of aluminum is not part of the lattice spinel structure. This is the case when the amount of aluminum used to make the catalyst composite is greater than the stoichiometric amount based on nickel and precious metal dopant present in the catalyst composite lattice spinel structure.

The term absence of Ni or NiO or dopant metal oxides as used herein includes amount of these species in the catalyst composite that are below the detection limit of the X-ray diffractometer (XRD). For example, the X-ray diffractometer MiniFlex II used to characterize various samples in the examples described below has a detection limit of 1 wt %.

In another embodiment the first metal dopant (A) in the catalyst composite is a precious metal, for example Pt, Rh, and/or Ru. The atomic ratio of first metal dopant (A) to Ni ranges from about greater than zero to about less than one. The amount of Ni in the catalyst composite ranges from about 5 wt % to about 33 wt % based on a total weight of the catalyst, and substantially all of the nickel is part of the doped spinel lattice structure.

The second metal dopant (B) in the spinel lattice structure of the catalyst composite is selected from La, Ce, Ti, V, Cr, Mn, Fe, Co, Cu, Y, Zr and combinations or mixtures thereof. The spinel lattice structure is formed by deriving the second metal dopant from one or more of water soluble metal salts such as a nitrate, chloride, acetate, oxalate, halide, sulfate and/or a hydrate thereof. The atomic ratio of second metal dopant (B) to Al in the catalyst is greater than zero, but less than about 10:90. In yet another embodiment the atomic ratio of second metal dopant (B) to Al is in a range of from about 0.1:99.9 to about 10:90, in another embodiment from about 0.5:99.5 to about 6:94. In yet another embodiment the atomic ratio of second metal dopant (B) to Al in the catalyst is in a range from about 0.5:99.5 to about 4:96. In embodiments where B is Ce, the Ce/Al atomic ratio ranges from about 1:99 to about 5:95, in another embodiment from about 2:98 to about 4:96.

The first dopant metal (A) and/or the second dopant metal (B) can be integrated in the spinel lattice structure of formula I utilizing appropriate water soluble metal salts such as a nitrate, chloride, acetate, oxalate, halide, sulfate and/or a hydrate thereof. The XRD pattern of the catalyst composite exhibits absence of peak intensities at Bragg's angles 2-theta of 44.5°±0.3° and 43.5°±0.3° indicating the absence of Ni and NiO, respectively. The crystallite size of this lattice spinel structure is smaller than the crystallite size of a spinel structure containing nickel and aluminum only manufactured according to the same process.

By stating that the first and/or the second dopant metal is integrated in the spinel lattice structure of formula I, it is intended to mean that said dopants are exchanged in the crystal lattice structure itself, and the atomic ratio of the second dopant metal to aluminum is controlled such that the second dopant is not susceptible to its oxide formation during the calcination step in the manufacturing process of the catalyst, as indicated by XRD analysis. This is beneficial because oxide formation of dopants causes a decrease in BET surface area of the catalyst composite. Therefore, the amount of dopant oxides presented in the catalyst composite should be limited.

In yet another embodiment, the catalyst composite of the invention comprises a lattice spinel structure of nickel, aluminum, and a dopant metal selected from transition metal series or lanthanide series that when air calcined at a temperature of from about 850° C. to about 1000° C., exhibits an XRD pattern that does not show a peak intensity at a Bragg's angle 2-theta corresponding to the oxide of second dopant, for example if the second dopant metal is Ce, the corresponding angle is about 28.7°, indicating absence of oxides of the dopant metal. The XRD pattern also exhibits a peak intensity at a Bragg's angle 2-theta of about 37.2°, indicating the presence of a lattice spinel structure having a crystallite size smaller than 5 nm. Furthermore the XRD pattern exhibits absence of a peak intensity at a Bragg's angle 2-theta of about 43.5°, indicating absence of NiO. The catalyst composite prepared by calcination at a temperature≥900° C. has a BET surface area of greater than about 70 m2/g. However, at a lower calcination temperature in the range of about 750° C. to about 850° C., the catalyst composite has higher BET surface area, ≥85 m2/g.

The invention also relates to a method of manufacturing a catalyst composite containing lattice structure of formula I for reforming hydrocarbons wherein the catalyst composite comprises nickel, aluminum, a first metal dopant (A), and a second metal dopant (B) in amounts, wherein substantially all of nickel is part of a spinel lattice structure containing aluminum and the second metal dopant (B). The manufacturing method includes the steps of:
  a) dissolving water soluble salts of Ni, a first metal dopant (A), aluminum, and a second metal dopant (B) in deionized water to provide an aqueous solution, while controlling pH to be in a range of from about 2 to about 5;
  b) heating the aqueous solution;
  c) adding a combustion fuel to the aqueous solution, and increasing the temperature effective to vaporize the water contained in the mixture and to form a viscous sol-gel;
  d) calcining the sol-gel to obtain the final catalyst powder, wherein said first metal dopant (A) is selected from precious metal groups of Pt, Rh, Ru, Ir, Pd, and Au, and said second metal dopant (B) is selected from trivalent cations of La, Ce, Ti, V, Cr, Mn, Fe, Co, Cu, Y, Zr and combinations or mixtures thereof.

In accordance with the present invention the amount of Ni in the water soluble salt used in step (a) results in a final catalyst composite containing Ni in an amount of from about 5 wt % to about 33 wt %, in another embodiment from about 5 wt % to about 25 wt %, and in yet another embodiment from about 5 wt % to about 20 wt %, calculated based on the initial weight of Ni in the water soluble salt of nickel and the total weight of catalyst powder obtained from the calcination step.

The catalyst composite of the invention is manufactured starting with water soluble salts of Ni, first metal dopant (A), aluminum, and second metal dopant (B), wherein said water soluble salts are selected from one or more of nitrate salts, chloride salts, acetate salts, oxalate salts, halide salts, sulfate salts and/or a hydrate thereof. The amount of second metal dopant (B) precursor and the amount of aluminum precursor can be selected such that the atomic ratio of said second metal dopant (B) to Al is in a range of from greater than zero to about 10:90; in another embodiment from about 0.01:99.99 to about 8:92; in another embodiment the second metal dopant (B) to Al is in a range of from about 0.5:99.5 to about 5:95. In embodiments where B is Ce, the Ce/Al atomic ratio ranges from about 1:99 to about 5:95, in another embodiment from about 2:98 to about 4:96. In order to enhance coking resistance, especially for hydrocarbon steam reforming with steam to carbon ratios below 2, it is advantageous to employ dopant metals that bond with oxygen, and/or at elevated temperature or in a reducing atmosphere form oxygen vacancies. One such metal is cerium. A catalyst composite that may or may not contain the spinel lattice structure of formula I can be manufactured starting with aluminum or second metal dopant (B) or both in oxide form, and the other metals of spinel lattice structure of formula I as one or more of nitrate salts, chloride salts, acetate salts, oxalate salts, halide salts, sulfate salts and/or a hydrate thereof.

The catalyst manufacturing method of the invention includes a step of forming an aqueous solution containing Ni nitrate, aluminum nitrate, cerium nitrate and optionally rhodium nitrate while controlling pH to be in a range of from about 2 to about 5. The aqueous solution is then heated to a temperature of from about 80° C. to about 100° C. A combustion fuel such as urea, glycine, ethylene glycol, or combinations or mixtures thereof is then added to the heated solution, which is further heated to form a viscous sol-gel. The sol-gel is then calcined in an oxygen containing atmosphere at a temperature of from about 750 to about 1000° C. to obtain the catalyst. The calcination step can yield the catalyst in a form such as a powder that can be engineered into a pellet, bead, monolith and the like. The calcination step can also yield the catalyst in a form, including a powder that can be deposited on a substrate, for example a metal foil substrate.

Basics about Spinel Structure

Spinels are a class of minerals of the general formula $AB_2O_4$. A is generally a divalent cation such as Mg, Cr, Mn, Fe, Co, Ni, Cu, Zn, Cd, Sn; and B is generally a trivalent cation such as Al, Ga, In, Ti, V, Cr, Mn, Fe, Co. Spinel structures can be either normal spinel type or inverse spinel type. Normal spinel types are cubic close-packed oxides with two tetrahedral and one octahedral site per formula unit. The tetrahedral spaces are smaller than the octahedral spaces. $B^{3+}$ ions occupy half the octahedral holes while $A^{2+}$ ions occupy one-eighth of the tetrahedral holes.

Oxides with the spinel crystal structure have a wide range of applications including in optical ceramics, lithium batteries, spinel pigments and as catalyst supports. $MgAl_2O_4$ and $CaAl_2O_4$ spinels are well known ceramic supports for reforming catalysts. Known spinel type catalysts are generally loaded into the reactor in the oxide state, and activated at high temperatures in $H_2$ containing environment to catalyze reforming reactions.

The catalyst of the present invention is synthesized using combustion techniques. Although many water soluble nickel salts such as nickel nitrate, nickel chloride, or nickel sulfate can be used as Ni active metal chemical precursors, the nitrate salt form is preferred in the present process because it does not require an additional hot water washing step to remove impurities after the catalyst powder is formed. Specific examples of water soluble salts include acetate salts, nitrate salts, sulfate salts, oxalate salts, halide salts and hydrates thereof. For example, rhodium nitrate, cerium nitrate, and aluminum nitrate are the preferred chemical precursors used in this process. To facilitate the active metals Ni and Rh nucleation process, the pH value of a mixed solution containing water soluble salts of the constituent elements is adjusted to a value of below about 5, in another embodiment from about 2 to 4, and in another embodiment close to 3, by adding an acidic solution. Examples of the acidic solutions that can be added to the salt solution in order to control the pH of the solution are those that comprise citric acid, nitric acid, sulfuric acid, ascorbic acid or a combination or mixture thereof. A combustion fuel is then added into the mixture for oxide catalyst powder synthesis. Examples of suitable combustion fuels include, but are not limited to, urea, glycine, ethylene glycol, or combinations or mixtures thereof. In the process of the invention, trivalent cations selected from the lanthanide series or the transition metals are doped into the spinel structure forming an oxide composite catalyst, which is much more stable and has higher catalytic performance when subjected to high temperatures (750 to 1000° C.) in an oxidative environment as compared to conventional catalysts.

An exemplary method of making the catalyst composite containing spinel type structures of formula (I) comprises:
a) Dissolving water soluble salts of Ni, precious metal, aluminum, and dopant metal in deionized water to provide an aqueous solution, while controlling pH to be in a range of from about 2 to about 5, in another embodiment from about 2 to 4, and in another embodiment about 3; Optionally adding one or more high temperature stabilizers to the aqueous solution;
b) Heating the aqueous solution;
c) Adding a combustion fuel to the aqueous solution, and increasing the temperature to vaporize the water contained in the mixture and to form a viscous mixture; and
d) Calcining the mixture in air to obtain the final oxide catalyst powder.

In step a), the amount of water-soluble salt of nickel added to the mixture is such that the amount of nickel present in the resulting final catalyst composition is a catalytically active amount, i.e., in an amount of from about 1 wt % to about 40 wt %, in another embodiment from about 5 to about 33 wt %, and in yet another embodiment from about 10 to about 25 wt %, based on the total weight of the catalyst.

In step a), the water-soluble salt of said first and second metals, the water-soluble salt of nickel, and the water-soluble salt of precious metals are used in such an amount that the lattice spinel structure of formula I in the resulting catalyst has an x value that ranges from about 0.01 to about 0.99, in another embodiment, from about 0.5 to about 0.99, and in another embodiment from about 0.8 to about 0.99. The water-soluble aluminum salt is, in one embodiment, aluminum nitrate. The dopants are derived from water-soluble salts such as nitrate salts of, for example, Ce, La, Ti, V, Cr, Mn, Fe, Co, Cu, Y, Zr or mixtures or combinations thereof. Chemical precursors of said dopants are generally in the form of trivalent cations. In Formula 1, y is greater than zero but less than about 0.2, in another embodiment, is greater than zero but less than about 0.1, and in another embodiment, greater than zero but less than about 0.05.

The high temperature stabilizers of step a) are chosen from ceramic powders of YSZ, stabilized $Al_2O_3$, BaO, CaO, $La_2O_3$, ceria stabilized zirconia, $Sm_2O_3$, perovskite, hexaaluminate, pyrochlore, hydrotalcite, or combinations or mixtures thereof. The particle size of the stabilizers is generally below about 10 micrometers, in another embodiment, below about 1 micrometer. The weight percentage of stabilizers containing in final catalyst composites is in the range of from about 0 wt % to about 50 wt %, in another embodiment, from about 1 wt % to about 20 wt %, and yet in another embodiment from about 1 wt % to about 10 wt %.

In step b), while the aqueous solution is mixing (e.g., by magnetic stirring), it is heated from approximately ambient temperature up to a temperature of from about 80° C. to about 100° C.

In step c), a combustion fuel is added to the aqueous solution and the temperature is raised to a temperature effective to vaporize the water contained in the mixture and to form a viscous mixture. Typically, a temperature in the range of from about 80° C. to about 150° C. is sufficient to vaporize the water present in said aqueous solution.

In step d), the viscous mixture is calcined, for example, in an atmosphere of air or an oxygen containing gas at a temperature of from about 750° C. to about 1200° C., in another embodiment from about of 750° C. to about 950° C.

The catalyst composite of the invention may be formed into any suitable shape. For example, the catalyst for reforming hydrocarbons may be in the form of a tablet, an extrudate, a pellet, a cylinder, a hollow cylinder, a powder, a bead, a washcoat composition deposited on a monolith substrate, a relatively high mechanical strength particulate, or a relatively high heat capacity particulate.

Table 1 compares the properties of the catalysts of the invention to those of the prior art.

TABLE 1

Catalyst properties of invention and prior art

| Present invention | Prior art |
| --- | --- |
| Suppresses inactive $NiAl_2O_4$ spinel formation | Easy to form inactive $NiAl_2O_4$ in oxidizing atmospheres |
| Expands reforming temperature range from 500 to 1000° C. | Limited reforming temperature range of 500 to 750° C. |
| Redox tolerant | Redox sensitive |
| Small crystallite size and high catalytic surface area is stable at high temperature | Particle agglomeration and catalytic surface reduction at high temperature |
| Close to equilibrium catalytic conversion even with short contact times | Feed gas space velocity is limited |
| Resists carbon formation at steam to carbon ratio down to 1.2 in steam reforming applications | Limited to steam to carbon ratio above 2 to avoid carbon formation |

By integrating dopants into a nickel aluminate spinel lattice, the catalysts of the invention exhibit broader operating temperature ranges of from about 500° C. up to 1000° C.; higher catalytic surface area, higher redox and coking tolerance; and naturally suppress inactive $NiAl_2O_4$ formation. These positive attributes enable catalytic reforming at higher operating temperatures, which leads to more syngas production and higher syngas quality with less methane slip. Additionally, the stable catalyst composite of the invention reduces catalyst replacement costs and plant shutdown risks. The catalyst composite of the invention does not require an activation step (treating with hydrogen), which makes SMR plants simpler to operate. Finally, the catalyst of the invention is much more tolerant to transient conditions or temperature excursions (e.g., emergency shutdown), is prone to be less susceptible to contaminants (e.g., sulfur) and has a longer lifespan compared to conventional catalysts.

The invention also relates to a method of reforming hydrocarbons with the catalysts of the invention. The composition, characteristics, and the manufacturing methods of the catalyst of the invention have been set forth above. The sources of hydrocarbons for the feed gas stream include but are not limited to fossil fuels such as natural gas, petroleum gas, naphtha, heavy oil, crude oils, coal, or the like; and/or non-fossil fuels such as mixed biomass including crude ethanol, wood wastes, and agricultural waste residue; municipal solid waste, pulp sludge, and grass straw. In one embodiment the hydrocarbon feed gas stream comprises methane.

The catalyst composite of the present invention broadens the operating envelope. In one embodiment, the reforming temperature is from about 500° C. to about 1100° C.; in another embodiment from about 700° C. to about 1000° C. at a pressure of about 0.5 to about 50 atm; in another embodiment from about 1 to about 20 atm. Gas hourly space velocity (GHSV) determined by dividing the volumetric flow rate of reactants at standard temperature and pressure of 0° C. and 1 atm by the amount of reforming catalysts (i.e. active metals with ceramic oxide carriers) in the reactor is commonly used to describe reactor reforming capacity. Tubular reactors in SMR plants using pellet catalysts typically operate in the range of about 10,000 to 150,000 cm$^3$/(hr g-cat). The catalyst of the current invention with higher catalytic surface area expands the reforming space velocity range from 10,000 to about 500,000 cm$^3$/(hr g-cat) while keeping the approach to equilibrium.

Material Characterization Methods

BET Surface Area Measurement

BET surface area of catalyst powder was measured using the instrument of Micromeritics ASAP 2010 (manufactured by Micromeritics Instrument Corporation, GA, USA). Test conditions used for the analysis are described below.

Adsorptive Gas Properties
  Nitrogen @ 77.35K liquid nitrogen;
  Non-ideality factor: 0.000062;
  Density conversion factor: 0.0015468
  Therm. Tran. Hard-sphere diameter: 3.860 A;
  Molecular cross-section area: 0.162 nm$^2$;

Equilibration Options
  Equilibration interval: 5 seconds;
  Minimum equilibration delay at P/Po>=0.995: 600 seconds;

Degassing Conditions
  Temperature ramp rate: 10° C./min;
  Target temperature: 90° C.;
  Evacuation rate: 50 mmHg/s;
  Unrestricted evacuation from: 5.0 mmHg;
  Vacuum setpoint: 500 µmHg;
  Evacuation time: 120 min;
  Hold pressure: 20 mmHg;

Sample Preparation

A glass sample tube was filled with powder using a filler rod. The inside diameter of the sample tube was 9.53 mm. The powder weight was determined by measuring the weight difference between the empty sample tube (with filler rod) and the powder-filled sample tube (with filler rod) under degassing conditions. The sample weights of the powders were targeted to be in the range of 0.95 to 0.98 grams.

Sample Backfill Options
  Backfill at start of analysis: yes;
  Backfill at end of analysis: yes;
  Backfill gas: helium;

X-Ray Diffraction

The X-ray diffraction (XRD) analysis of the catalyst samples was obtained using an X-ray diffractometer Mini-Flex II (manufactured and sold by Rigaku Corporation, Japan). The XRD analysis was conducted under the following conditions:

Source of X-ray: monochromatic Cu—Kα radiation
Tube output voltage: 30 kV
Tube output current: 15 mA
X-ray tube: Cu
Suppression filter: Ni filter
Soller slit: 2.5°
Scintillator detector: NaI (T1)
Datum angle: 2θ=10°
X-ray take-off angle: 6°
Divergence slit: 1.25°
Scatter slit: 1.25°
Receiving slit: 0.3 mm
Scanning speed: 1.2°/min second
Sampling interval: 0.02°
Scanning angle 2θ: 20° to 70°
Data analysis software: PDXL.

Crystallite size calculation: the data analysis software PDXL uses Scherrer Equation given below to calculate average crystallite size.

$$L = \frac{K\lambda}{\beta \cos\theta}$$

where L is the average crystallite size, K is Scherrer constant with value of 0.89, λ is the X-ray wavelength of 0.15405 nm, β is the full width at half maximum (FWHM) of peak at Bragg's angle 2-theta.

XRD Sample Preparation

About 0.5 grams of test powder was placed in an agate mortar and ground manually for 2 minutes with an agate pestle. The milled powder was then placed on a sample-holder made of glass for an XRD measurement. The glass sample holder had a rectangular recess in the center with dimension of 20 mm length×20 mm width×0.5 mm depth. The powder in the recess was pressed using a smooth glass plate in order to ensure that the powder surface was flat and sufficiently well packed into the rectangular recess of the sample holder.

Catalysts According to Prior Art

Catalysts known in the art typically disperse an active metal on a support surface. Support properties play an important role in achieving high catalytic activity and in offering resistance to sintering and coke formation. Catalysts with a strong interaction between the metal particle and supports tend to have high resistance to sintering and coking. Common support for reforming catalysts is $Al_2O_3$, having high surface area and porosity. Magnesium aluminate spinel is also widely used as a catalyst support due to its high temperature stability. The amount of $MgAl_2O_4$ contained in the support however is limited due to its low specific surface area. To increase surface area, the $MgAl_2O_4$ composite is ground down to nanoparticle size and doped with promoters such as La, Ce, Y, Gd in order to suppress particle agglomeration at high temperature. Three catalyst supports were prepared and then active metal nickel was deposited as described below.

Example A—NiO on Magnesium Aluminate Support

First a catalyst support was prepared using magnesium nitrate and aluminum nitrate. 27.2 grams of magnesium nitrate hexahydrate ($(Mg(NO_3)_2 \cdot 6H_2O$, crystalline, from Sigma Aldrich), 79.5 grams of aluminum nitrate nonahydrate ($Al(NO_3)_3 \cdot 9H_2O$, from Sigma Aldrich), 53.0 grams of deionized water and 21.2 grams of citric acid ($C_6H_8O_7$, anhydrous, from Alfa Aesar) were added to a glass beaker in order to form an aqueous solution of the metal salts. The citric acid addition was used to control the pH of the aqueous solution to a value of about 3. The glass beaker containing the aqueous solution was placed in an ultrasonic water bath for 20 minutes in order to ensure that the precursors were fully dissolved and well mixed. The glass beaker was subsequently uncovered and heated at 80° C. on a hot plate with a magnetic stirrer for 15 minutes after which 31.6 grams of ethylene glycol (99%, from Alfa Aesar) was added. The hot plate temperature was then increased to 150° C. and stirring continued for about 2 hours in order to evaporate the water contained in the mixture and form a viscous mixture. The mixture was then transferred to a ceramic crucible without a cover and loaded into an electrically heated furnace and calcined in air at temperature of 850° C. (heating ramp rate of 3° C./minute, dwell at 850° C. for 3 hours, cooling rate of 3° C./minute). The final weight of the resulting calcined powder was about 15.1 gram. The crystallite size of spinel in the calcined powder was near 7.2 nm calculated by the Scherrer Equation using XRD peak near 37.2 degree.

Next, a conventional wet-impregnation technique was used to introduce catalytically active Ni metal on the catalyst support that is calcined $MgAl_2O_4$ powder synthesized above. 15.1 grams of the calcined $MgAl_2O_4$ powder was dry milled using 250 grams of 1.5 mm YSZ spherical grinding media in a 3 oz jar which was continuously rotated overnight at a roller speed of 170 to 175 rpm. The average particle size of catalyst powder was about 1.5 am. 11.8 grams of milled $MgAl_2O_4$ powder was dispersed in 40 grams of deionized water. 12.8 grams of nickel nitrate hexahydrate ((Ni(NO_3)_2.6H_2O, crystalline, from Sigma Aldrich) was added and dissolved in the aqueous solution, followed with an ultrasonic mixing for 20 minutes. The mixture was then dried at 120° C. overnight and the residue was air calcined at 850° C. for 3 h. The final weight of the resulting calcined powder was about 14.9 gram.

Example B—NiO on Cerium Doped Magnesium Aluminate Support (Ce/Al Molar Ratio of 2/98)

In this example also, first a catalyst support was prepared using nitrate salts of magnesium, aluminum and cerium. 27.2 grams of magnesium nitrate hexahydrate ((Mg(NO_3)_2.6H_2O, crystalline, from Sigma Aldrich), 79.5 grams of aluminum nitrate nonahydrate ($Al(NO_3)_3.9H_2O$, from Sigma Aldrich), 2.0 grams of cerium nitrate hexahydrate ($Ce(NO_3)_3.6H_2O$, from Sigma Aldrich), 53.0 grams of deionized water and 21.2 grams of citric acid ($C_6H_8O_7$, anhydrous, from Alfa Aesar) were added to a glass beaker in order to form an aqueous solution of the metal salts. The citric acid addition was used to control the pH of the aqueous solution to a value of about 3. The glass beaker containing the aqueous solution was placed in an ultrasonic water bath for 20 minutes in order to ensure that the precursors were fully dissolved and well mixed. The glass beaker was subsequently uncovered and heated at 80° C. on a hot plate with a magnetic stirrer for 15 minutes after which 31.6 grams of ethylene glycol (99%, from Alfa Aesar) was added. The hot plate temperature was then increased to 150° C. and stirring continued for about 2 hours in order to evaporate the water contained in the mixture and form a viscous mixture. The mixture was then transferred to a ceramic crucible without a cover and loaded into an electrically heated furnace and calcined in air at temperature of 850° C. (heating ramp rate of 3° C./minute, dwell at 850° C. for 3 hours, cooling rate of 3° C./minute). The final weight of the resulting calcined support powder was about 15.5 gram. The crystallite size of spinel in the calcined powder was near 4.4 nm calculated by the Scherrer Equation using XRD peak with the Bragg's angle 2-theta near 37.2 degree.

Similar to Example A, active metal nickel was deposited on the catalyst support, cerium doped magnesium aluminate spinel made above. 15.5 grams of calcined $Mg(Ce,Al)_2O_4$ powder was dry milled with 250 grams of 1.5 mm YSZ spherical grinding media in a 3 oz jar which was continuously rotated overnight at a roller speed of 170 to 175 rpm. The average particle size of catalyst support powder was about 1.4 m. 11.8 grams of milled $Mg(Ce,Al)_2O_4$ powder was dispersed in 40 grams of deionized water. 12.8 grams of nickel nitrate hexahydrate ((Ni(NO_3)_2.6H_2O, crystalline, from Sigma Aldrich) was added and dissolved in the aqueous solution, followed with an ultrasonic mixing for 20 minutes. The mixture was then dried at 120° C. overnight and the residue was air calcined at 850° C. for 3 h. The final weight of the resulting calcined powder was about 15.1 gram. Calcination temperatures at 950 and 1000° C. were also investigated.

Example C— NiO on Lanthanum Doped Magnesium Aluminate Support (La/Al Molar Ratio of 2/98)

Similar to Examples A and B above, first a catalyst support was prepared using nitrate salts of magnesium, aluminum and lanthanum. 27.2 grams of magnesium nitrate hexahydrate ((Mg(NO_3)_2.6H_2O, crystalline, from Sigma Aldrich), 79.5 grams of aluminum nitrate nonahydrate (Al(NO_3)_3.9H_2O, from Sigma Aldrich), 2.0 grams of lanthanum nitrate hexahydrate ($La(NO_3)_3.6H_2O$, from Sigma Aldrich), 53.0 grams of deionized water and 21.2 grams of citric acid ($C_6H_8O_7$, anhydrous, from Alfa Aesar) were added to a glass beaker in order to form an aqueous solution of the metal salts. The citric acid addition was used to control the pH of the aqueous solution to a value of about 3. The glass beaker containing the aqueous solution was placed in an ultrasonic water bath for 20 minutes in order to ensure that the precursors were fully dissolved and well mixed. The glass beaker was subsequently uncovered and heated at 80° C. on a hot plate with a magnetic stirrer for 15 minutes after which 31.6 grams of ethylene glycol (99%, from Alfa Aesar) was added. The hot plate temperature was then increased to 150° C. and stirring continued for about 2 hours in order to evaporate the water and form a viscous mixture. The mixture was then transferred to a ceramic crucible without a cover and loaded into an electrically heated furnace and calcined in air at temperature of 850° C. (heating ramp rate of 3° C./minute, dwell at 850° C. for 3 hours, cooling rate of 3° C./minute). The final weight of the resulting calcined powder was about 15.4 gram. The crystallite size of spinel in the calcined powder was near 4.9 nm calculated by the Scherrer Equation using XRD peak with the Bragg's angle 2-theta near 37.2 degree.

Similar to Examples A and B above, active metal nickel was deposited on the catalyst support, lanthanum doped magnesium aluminate spinel made above. 15.4 grams of calcined $Mg(La,Al)_2O_4$ powder from Example E was dry milled with 250 grams of 1.5 mm YSZ spherical grinding media in a 3 oz jar which was continuously rotated overnight with roller speed of 170 to 175 rpm. The average particle size of catalyst powder was about 1.5 am. 11.8 grams of milled $Mg(La,Al)_2O_4$ powder was dispersed in 40 grams of deionized water. 12.8 grams of nickel nitrate hexahydrate ((Ni(NO$_3$)$_2$.6H$_2$O, crystalline, from Sigma Aldrich) was added and dissolved in the aqueous solution, followed with an ultrasonic mixing for 20 minutes. The mixture was then dried at 120° C. overnight and the residue was air calcined at 850° C. for 3 h. The final weight of the resulting calcined powder was about 15.2 gram. Calcination temperatures at 950 and 1000° C. were also investigated.

FIG. 1 shows the XRD patterns of the catalyst supports made in Examples A, B, and C described above. FIG. 1 also shows XRD patterns of CeO$_2$, and La$_2$O$_3$. The CeO$_2$ XRD pattern shows peak intensity at Bragg's angle 2-theta of about 28.7° and the La$_2$O$_3$ XRD pattern shows peak intensity at Bragg's angle 2-theta of about 39.8°. The XRD of catalyst supports prepared using chemical precursors of nitrates of magnesium, aluminum and dopant (cerium in Example B, and lanthanum in Example C) with dopant to aluminum molar ratio of 2/98, suggests the dopant to be fully integrated into the magnesium aluminate spinel. The XRD pattern of cerium doped catalyst support in Example B does not show a peak intensity corresponding to the presence of cerium oxide, and the XRD pattern of lanthanum doped catalyst support in Example C does not show a peak intensity corresponding to the presence of lanthanum oxide. Using Scherrer equation, the crystallite sizes of magnesium spinel (Bragg's angle 2-theta of about 37.20) in the catalyst support without any dopant (Example A), with cerium dopant (Example B) and with lanthanum dopant (Example C) were calculated to be 7.2, 4.4, and 4.9 nm, respectively. Commercially available magnesium aluminate spinel from American Elements is reported to have average crystallite size of 30-50 nm, surface area of 12-17 m$^2$/g. Applying the synthesis method using nitrate precursors to prepare the catalyst support significantly inhibited nanoparticle from coarsening at high temperature.

Figure 2:
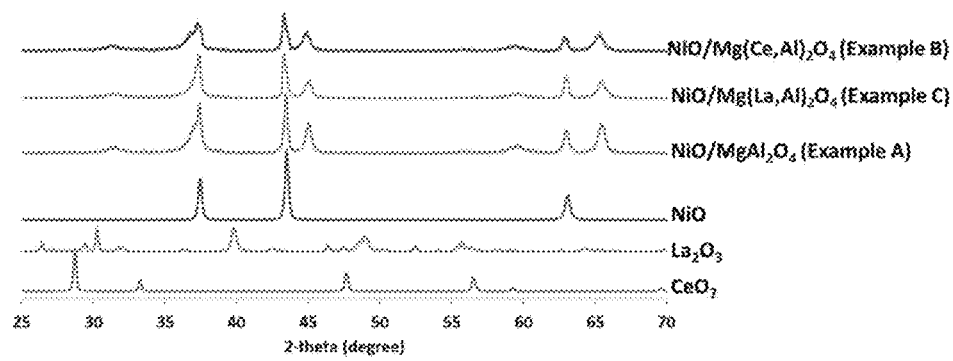
FIG. 2 shows XRD patterns of NiO on magnesium aluminate catalysts prepared in Examples A to C.

Now referring to FIG. 2, XRD patterns of NiO catalysts prepared in Examples A, B and C are shown. The XRD patterns of CeO$_2$ and La$_2$O$_3$ in FIG. 2 are the same as that shown in FIG. 1. FIG. 2 also shows XRD pattern of NiO that has a peak intensity at Bragg's angle 2-theta of about 43.5°. The catalysts made in examples A, B and C also show peak intensity at Bragg's angle 2-theta of about 43.5°, indicating the presence of nickel as NiO. This suggests that the active metal NiO was deposited on the spinel support. The absence of peak intensity at Bragg's angle 2-theta of about 28.7° in example B indicates that the cerium is part of the lattice spinel structure. Similarly the absence of peak intensity at Bragg's angle 2-theta of about 39.8° in example C indicates that the lanthanum is part of the lattice spinel structure. Using Scherrer equation the crystallite sizes of NiO (Bragg's angle 2-theta of about 43.5°) in the catalyst without any dopant (Example A), with cerium dopant (Example B) and with lanthanum dopant (Example C) were calculated to be 29.4, 19.8 and 21.3 nm, respectively. The cerium doped and lanthanum doped magnesium aluminate spinels in the catalysts of Examples A, B and C appear to have maintained a crystallite size of below 10 nm, however, the active metal NiO crystallite size is bigger and the NiO is present as a second phase. This is consistent with prior art findings that the weak interactions between nickel oxide particles and catalyst supports would lead to significant increase in crystallite size of NiO due to agglomeration at high sintering temperature. Similarly, formation of NiO with large crystallite sizes could be mainly due to the weak bonding interaction between active metal and spinel supports. For example, catalysts of Example B and C, based on cerium doped and lanthanum doped magnesium aluminate supports, respectively, when calcined at 850° C. yield NiO crystallite sizes of 19.8 and 21.3 nm, respectively, which are smaller than the NiO crystallite in Example A catalyst that deposited nickel oxide on undoped magnesium aluminate catalyst support. The catalyst product of Example B made by carrying out the calcination step at 1000° C. exhibited a XRD peak intensity near 28.7 degrees, suggesting the presence of CeO$_2$ as a second phase (XRD not shown). The XRD of catalyst product of Example C made by carrying out calcination at 1000° C., however, did not exhibit a peak intensity near 30.3 degrees, suggesting absence of detectable La$_2$O$_3$, in other words lanthanum retained in the spinel structure.

The method of the invention allows for the integration of catalytically active metals into a doped spinel structure and limits the crystallite growth of the doped spinel structure at high temperature, as described below.

Catalyst According to this Invention

Three different sets of catalyst samples were prepared. The first set (Example 1) by:
a) Dissolving water soluble salts of Ni, aluminum, and cerium in deionized water to provide an aqueous solution, while controlling pH to be about 3
b) Heating the aqueous solution
c) Adding a combustion fuel to the aqueous solution, and increasing the temperature to vaporize the water contained in the mixture and to form a viscous mixture
d) Calcining the mixture in air to obtain catalyst powder.

In the second set (Examples 5, 6, 7, 8 and 9), precious metal rhodium nitrate was also dissolved in step (a) and a high temperature stabilizer 3YSZ was added to the aqueous solution. The resulting solution was subjected to steps b, c and d as described above.

In the third set catalyst samples (Examples 2, 3, and 4) were prepared using cerium oxide or aluminum oxide instead of the cerium nitrate or aluminum nitrate in step (a). Steps b, c and d were followed as above.

Example 1—Ni Aluminate Spinel (Chemical Precursors of Ce Nitrate and Al Nitrate)

12.8 grams of nickel nitrate hexahydrate ((Ni(NO$_3$)$_2$.6H$_2$O, crystalline, from Sigma Aldrich), 79.4 grams of aluminum nitrate nonahydrate (Al(NO$_3$)$_3$.9H$_2$O, from Sigma Aldrich), 2.0 grams of cerium nitrate hexahydrate (Ce(NO$_3$)$_3$.6H$_2$O, from Sigma Aldrich), 53.0 grams of deionized water, and 21.2 grams of citric acid (C$_6$H$_8$O$_7$, anhydrous, from Alfa Aesar) were added to a glass beaker in order to form an aqueous solution of the metal salts. The citric acid addition was used to control the pH of the aqueous solution to a value of about 3. The glass beaker containing the aqueous solution was placed in an ultrasonic water bath for 20 minutes in order to ensure that the precursors were fully dissolved and well mixed. The glass beaker was subsequently uncovered, and heated at 80° C. on a hot plate with a magnetic stirrer for 15 minutes after which 31.6 grams of ethylene glycol (99%, from Alfa Aesar) was added. The hot plate temperature was then increased to 150° C. and stirring continued for about 2 hours in order to evaporate the water and form a viscous mixture. The mixture was then transferred to a ceramic crucible without a cover and loaded into an electrically heated furnace and calcined in air at temperature of 750° C. (heating ramp rate of 3° C./minute, dwell at 750° C. for 3 hours, cooling rate of 3° C./minute). Calcination temperatures of 850, 950, and 1000° C. were also investigated. The resulting catalyst powders calcined at 850 and 950° C. were green in color.

Example 2—Ni Aluminate Spinel (Chemical Precursors of Ce Oxide and Al Nitrate)

12.8 grams of nickel nitrate hexahydrate ((Ni$(NO_3)_2 \cdot 6H_2O$, crystalline, from Sigma Aldrich), 79.4 grams of aluminum nitrate nonahydrate ($Al(NO_3)_3 \cdot 9H_2O$, from Sigma Aldrich), 0.8 grams of cerium oxide ($CeO_2$, surface area of 11 to 17 $m^2/g$, particle size of 50 to 80 nm, from Inframat Advanced Materials), 53.0 grams of deionized water and 21.2 grams of citric acid ($C_6H_8O_7$, anhydrous, from Alfa Aesar) were added to a glass beaker in order to form an aqueous solution. The citric acid addition was used to control the pH of the aqueous solution to a value of about 3. The glass beaker containing the aqueous solution was placed in an ultrasonic water bath for 20 minutes in order to ensure that the precursors were fully dissolved and well mixed. The glass beaker was subsequently uncovered, and heated at 80° C. on a hot plate with a magnetic stirrer for 15 minutes after which 31.6 grams of ethylene glycol (99%, from Alfa Aesar) was added. The hot plate temperature was then increased to 150° C. and stirring continued for about 2 hours in order to evaporate the water and form a viscous mixture. The mixture was then transferred to a ceramic crucible without a cover and loaded into an electrically heated furnace and calcined in air at temperature of 750° C. (heating ramp rate of 3° C./minute, dwell at 750° C. for 3 hours, cooling rate of 3° C./minute). Calcination temperatures of 850, 950, and 1000° C. were also investigated. The catalyst powders calcined at 850 and 950° C. were blue in color.

Example 3 Ni Aluminate Spinel (Chemical Precursors of Ce Nitrate and Al Oxide)

12.8 grams of nickel nitrate hexahydrate ((Ni$(NO_3)_2 \cdot 6H_2O$, crystalline, from Sigma Aldrich), 10.8 grams of aluminum oxide ($Al_2O_3$, 80 to 95% gamma phase and balance alpha phase, surface area of 100 $m^2/g$, particle size of 0.25 micrometer, from Alfa Aesar), 2.0 grams of cerium nitrate hexahydrate ($Ce(NO_3)_3 \cdot 6H_2O$, from Sigma Aldrich), 53.0 grams of deionized water and 21.2 grams of citric acid ($C_6H_8O_7$, anhydrous, from Alfa Aesar) were added to a glass beaker in order to form an aqueous solution. The citric acid addition was used to control the pH of the aqueous solution to a value of about 3. The glass beaker containing the aqueous solution was placed in an ultrasonic water bath for 20 minutes in order to ensure that the precursors were fully dissolved and well mixed. The glass beaker was subsequently uncovered, and heated at 80° C. on a hot plate with a magnetic stirrer for 15 minutes after which 31.6 grams of ethylene glycol (99%, from Alfa Aesar) was added. The hot plate temperature was then increased to 150° C. and stirring continued for about 2 hours in order to evaporate the water and form a viscous mixture. The mixture was then transferred to a ceramic crucible without a cover and loaded into an electrically heated furnace and calcined in air at temperature of 750° C. (heating ramp rate of 3° C./minute, dwell at 750° C. for 3 hours, cooling rate of 3° C./minute). Calcination temperatures of 850, 950, and 1000° C. were also investigated. The catalyst powders calcined at 850 and 950° C. were light green in color.

Example 4 Ni Aluminate Spinel (Chemical Precursors of Ce Oxide and Al Oxide)

12.8 grams of nickel nitrate hexahydrate ((Ni$(NO_3)_2 \cdot 6H_2O$, crystalline, from Sigma Aldrich), 10.8 grams of aluminum oxide ($Al_2O_3$, 80 to 95% gamma phase and balance alpha phase, surface area of 100 $m^2/g$, particle size of 0.25 micrometer, from Alfa Aesar), 0.8 grams of cerium oxide ($CeO_2$, surface area of 11 to 17 $m^2/g$, particle size of 50 to 80 nm, from Inframat Advanced Materials), and 53.0 grams of deionized water and 21.2 grams of citric acid ($C_6H_8O_7$, anhydrous, from Alfa Aesar) were added to a glass beaker. The citric acid addition was used to control the pH of the aqueous solution to a value of about 3. The glass beaker containing the aqueous solution was placed in an ultrasonic water bath for 20 minutes in order to ensure that the precursors were fully dissolved and well mixed. The glass beaker was subsequently uncovered, and heated at 80° C. on a hot plate with a magnetic stirrer for 15 minutes after which 31.6 grams of ethylene glycol (99%, from Alfa Aesar) was added. The hot plate temperature was then increased to 150° C. and stirring continued for about 2 hours in order to evaporate the water and form a viscous mixture. The mixture was then transferred to a ceramic crucible without a cover and loaded into an electrically heated furnace and calcined in air at temperature of 750° C. (heating ramp rate of 3° C./minute, dwell at 750° C. for 3 hours, cooling rate of 3° C./minute). Calcination temperatures of 850, 950, and 1000° C. were also investigated. The catalyst powders that were calcined at 850 and 950° C. were blue in color.

Figure 3:
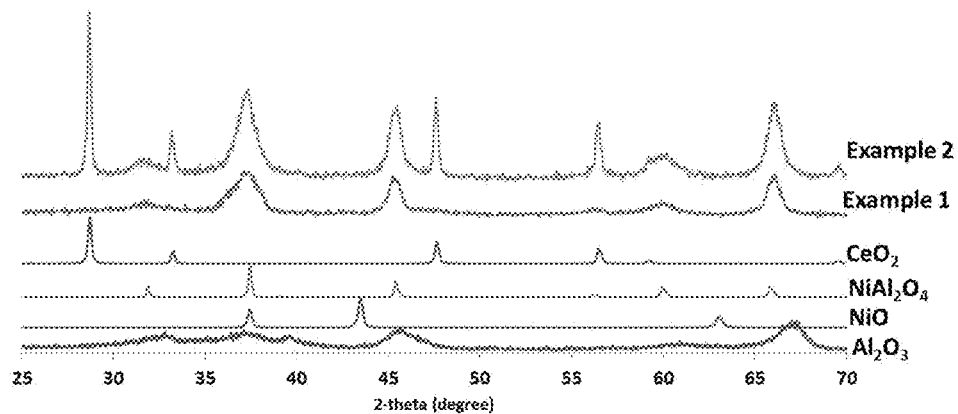
FIG. 3 shows XRD patterns of catalysts synthesized in Examples 1 and 2.
Figure 4:
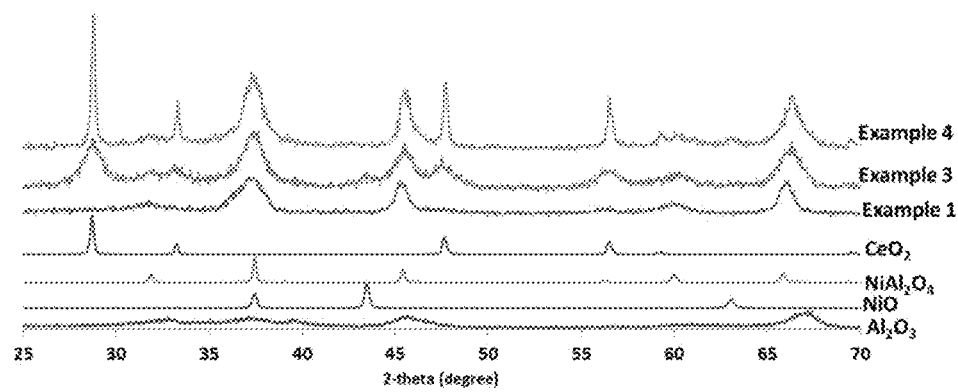
FIG. 4 shows XRD patterns of catalysts synthesized in Examples 1, 3 and 4.

FIGS. 3 and 4 show the XRD patterns of the catalyst powders synthesized in Examples 1 to 4 calcined at 850° C. $CeO_2$, $NiAl_2O_4$, NiO, and $Al_2O_3$ were purchased and run as references in the XRD analysis, ahead of characterizing the synthesized catalyst powders. The XRD peak intensities near 28.7, 37.2, and 43.5 degrees are the main peaks for $CeO_2$, $NiAl_2O_4$ spinel, and NiO, respectively. FIG. 3 shows that no oxides of cerium and nickel could be detected in the XRD analysis of the powder synthesized in Example 1 that used cerium nitrate as the chemical precursor for the Ce dopant. This suggests that both Ni and Ce were formed into solid solution in the spinel structure by using the process described in Example 1. In Example 2, cerium oxide was used as the precursor for the Ce dopant in place of the cerium nitrate used in Example 1. A strong intensity of XRD peak near 28.7 degree was detected in the XRD analysis for the powder synthesized in Example 2, indicating presence of $CeO_2$ as a second phase along with the $NiAl_2O_4$ spinel structure. FIG. 4 further suggests that nitrates of cerium and aluminum favor the formation of a solid solution of cerium in the doped $Ni(Ce,Al)_2O_4$ spinel structure using the method described in Example 1.

The crystallite sizes of the doped Ni aluminate spinels synthesized in Examples 1 to 4 at calcination temperatures of 750 and 850° C. were estimated using the Scherrer Equation and are summarized in Table 2. Consistent with the results of the doped Mg aluminate spinels of Examples B and C, more stable and smaller crystallite sizes for the Ni aluminate spinels were obtained when Ce was doped into solid solution with the Ni aluminate spinel using the method described in Example 1. Furthermore, BET surface area measurements of the synthesized catalyst powders showed the highest surface area (about 94 $m^2/g$ at 850° C. calcination) for the powder synthesized in Example 1, indicating the lowest effect of particle sintering at high temperature as compared to the other examples. Table 2 also provides the comparisons of Examples 1 to 4 with respects to their XRD peak intensity ratios of $I_{CeO2}/I_{spinel}$ and $(I_{spinel}/I_{spinel+Al2O3})$. Ratios of $I_{CeO2}/I_{spinel}$ for catalyst composites calcined at 850° C. in Examples 1 and 3 are about 0 and 0.81, respectively, and they are lower than other examples. It is also worthwhile to mention that because Examples 1 and 3 have lower ratio values of $I_{CeO2}/I_{spinel}$, suggesting lower concentration of $CeO_2$ in catalyst composite, these two examples have higher BET surface areas and smaller crystallite sizes, which resulting in high catalytic reforming performances. Therefore, the amount of dopant oxides presented in the catalyst composite should be limited. Namely, the peak intensity ratio of dopant oxide to spinel ($I_{dopant-oxide}/I_{spinel}$) measured in a XRD pattern should be controlled under certain range.

Example 5 NiRh Aluminate Spinel (Chemical Precursors of Ce Oxide and Al Oxide, Ce/Al of 2/98) with YSZ Addition About 3% (by weight) of Ni was replaced with Rh in the catalyst composite. 12.5 grams of nickel nitrate hexahydrate ((Ni(NO$_3$)$_2$.6H$_2$O, crystalline, from Sigma Aldrich), 0.2 grams of rhodium nitrate hydrate (Rh(NO$_3$)$_3$.xH$_2$O, 36% Rh basis, from Sigma Aldrich), 10.8 grams of aluminum oxide (Al$_2$O$_3$, 80 to 95% gamma phase and balance alpha phase, surface area of 100 m$^2$/g, average particle size of 0.25 micrometer, from Alfa Aesar), 0.8 grams of cerium oxide (CeO$_2$, surface area of 11 to 17 m$^2$/g, average particle size of 50 to 80 nm, from Inframat Advanced Materials), 53.0 grams of deionized water, 21.2 grams of citric acid (C$_6$H$_8$O$_7$, anhydrous, from Alfa Aesar), and 1.1 grams of yttria-stabilized zirconia (TZ-3Y-E, 3 mol. % of Y$_2$O$_3$, surface area of 5 to 9 m$^2$/g, average particle size of 0.4 micrometer, from Tosoh) were added to a glass beaker. The glass beaker containing the aqueous solution was placed in an ultrasonic water bath for 20 minutes in order to ensure that the precursors were fully dissolved and well mixed. The glass beaker was subsequently uncovered, and heated at 80° C. on a hot plate with a magnetic stirrer for 15 minutes after which 31.6 grams of ethylene glycol (99%, from Alfa Aesar) was added. The hot plate temperature was then increased to 150° C. and stirring continued for about 2 hours in order to evaporate the water and form a viscous mixture. The mixture was then transferred to a ceramic crucible without a cover, loaded into an electrically heated furnace and calcined in air at temperature of 750° C. (heating ramp rate of 3° C./minute, dwell at 750° C. for 3 hours, cooling rate of 3° C./minute). Calcination temperatures of 850, 950, and 1000° C. were also investigated. The resulting catalyst powder was blue in color.

Example 6 NiRh Aluminate Spinel (Chemical Precursors of Ce Nitrate and Al Nitrate, Ce/Al of 2/98) with YSZ Addition 12.5 grams of nickel nitrate hexahydrate ((Ni(NO$_3$)$_2$.6H$_2$O, crystalline, from Sigma Aldrich), 0.2 grams of rhodium nitrate hydrate (Rh(NO$_3$)$_3$.xH2O, 36% Rh basis, from Sigma Aldrich), 79.4 grams of aluminum nitrate nonahydrate (Al(NO$_3$)$_3$.9H$_2$O, from Sigma Aldrich), 2.0 grams of cerium nitrate hexahydrate (Ce(NO$_3$)$_3$.6H$_2$O, from Sigma Aldrich), and 1.1 grams of yttria-stabilized zirconia (TZ-3Y-E, 3 mol. % of Y$_2$O$_3$, surface area of 5 to 9 m$^2$/g, average particle size of 0.4 micrometer, from Tosoh) were added to a glass beaker. The citric acid addition was used to control the pH of the aqueous solution to a value of about 3. The glass beaker containing the aqueous solution was placed in an ultrasonic water bath for 20 minutes in order to ensure that the precursors were fully dissolved and well mixed. The glass beaker was subsequently uncovered and heated at 80° C. on a hot plate with a magnetic stirrer for 15 minutes after which 31.6 grams of ethylene glycol (99%, from Alfa Aesar) was added. The hot plate temperature was then increased to 150° C. and stirring continued for about 2 hours in order to evaporate the water and form a viscous mixture. The mixture was then transferred to a ceramic crucible without a cover and loaded into an electrically heated furnace and calcined in air at temperature of 750° C. (heating ramp rate of 3° C./minute, dwell at 750° C. for 3 hours, cooling rate of 3° C./minute). Calcination temperatures of 850, 950, and 1000° C. were also investigated. The resulting catalyst powder was green in color.

Example 7 NiRh Aluminate Spinel (Chemical Precursors of Ce Nitrate and Al Nitrate, Ce/Al of 4/96) with YSZ Addition 12.5 grams of nickel nitrate hexahydrate ((Ni(NO$_3$)$_2$.6H$_2$O, crystalline, from Sigma Aldrich), 0.2 grams of rhodium nitrate hydrate (Rh(NO$_3$)$_3$.xH$_2$O, 36% Rh basis, from Sigma Aldrich), 77.9 grams of aluminum nitrate nonahydrate (Al(NO$_3$)$_3$.9H$_2$O, from Sigma Aldrich), 3.7 grams of cerium nitrate hexahydrate (Ce(NO$_3$)$_3$.6H$_2$O, from Sigma Aldrich), and 1.1 grams of yttria-stabilized zirconia (TZ-3Y-E, 3 mol. % of Y$_2$O$_3$, surface area of 5 to 9 m$^2$/g, average particle size of 0.4 micrometer, from Tosoh) were added to a glass beaker in order to form an aqueous solution of the metal salts. The citric acid addition was used to control the pH of the aqueous solution to a value of about 3. The glass beaker containing the aqueous solution was placed in an ultrasonic water bath for 20 minutes in order to ensure that the precursors were fully dissolved and well mixed. The glass beaker was subsequently uncovered and heated at 80° C. on a hot plate with a magnetic stirrer for 15 minutes after which 31.6 grams of ethylene glycol (99%, from Alfa Aesar) was added. The hot plate temperature was then increased to 150° C. and stirring continued for about 2 hours in order to evaporate the water and form a viscous mixture. The mixture was then transferred to a ceramic crucible without a cover, loaded into an electrically heated furnace and calcined in air at temperature of 850° C. (heating ramp rate of 3° C./minute, dwell at 850° C. for 3 hours, cooling rate of 3° C./minute). The resulting catalyst powder was green in color.

Example 8 NiRh Aluminate Spinel (Chemical Precursors of Ce Nitrate and Al Nitrate, Ce/Al of 6/94) with YSZ Addition 12.5 grams of nickel nitrate hexahydrate ((Ni(NO$_3$)$_2$.6H$_2$O, crystalline, from Sigma Aldrich), 0.2 grams of rhodium nitrate hydrate (Rh(NO$_3$)$_3$.xH$_2$O, 36% Rh basis, from Sigma Aldrich), 76.2 grams of aluminum nitrate nonahydrate (Al(NO$_3$)$_3$.9H$_2$O, from Sigma Aldrich), 5.6 grams of cerium nitrate hexahydrate (Ce(NO$_3$)$_3$.6H$_2$O, from Sigma Aldrich), and 1.1 grams of yttria-stabilized zirconia (TZ-3Y-E, 3 mol. % of Y$_2$O$_3$, surface area of 5 to 9 m$^2$/g, average particle size of 0.4 micrometer, from Tosoh) were added to a glass beaker in order to form an aqueous solution of the metal salts. The citric acid addition was used to control the pH of the aqueous solution to a value of about 3. The glass beaker containing the aqueous solution was placed in an ultrasonic water bath for 20 minutes in order to ensure that the precursors were fully dissolved and well mixed. The glass beaker was subsequently uncovered and heated at 80° C. on a hot plate with a magnetic stirrer for 15 minutes after which 31.6 grams of ethylene glycol (99%, from Alfa Aesar) was added. The hot plate temperature was then increased to 150° C. and stirring continued for about 2 hours in order to evaporate the water and form a viscous mixture. The mixture was then transferred to a ceramic crucible without a cover, loaded into an electrically heated furnace and calcined in air at temperature of 850° C. (heating ramp rate of 3° C./minute, dwell at 850° C. for 3 hours, cooling rate of 3° C./minute). The resulting catalyst powder was green in color.

Example 9 NiRh Aluminate Spinel (Chemical Precursors of Ce Oxide and Al Oxide, Ce/Al of 6/94, More Active Metals NiRh) with YSZ Addition 25.0 grams of nickel nitrate hexahydrate ((Ni(NO$_3$)$_2$.6H$_2$O, crystalline, from Sigma Aldrich), 0.4 grams of rhodium nitrate hydrate (Rh(NO$_3$)$_3$.xH$_2$O, 36% Rh basis, from Sigma Aldrich), 76.2 grams of aluminum nitrate nonahydrate (Al(NO$_3$)$_3$.9H$_2$O, from Sigma Aldrich), 5.6 grams of cerium nitrate hexahydrate (Ce(NO$_3$)$_3$.6H$_2$O, from Sigma Aldrich), and 1.1 grams of yttria-stabilized zirconia (TZ-3Y-E, 3 mol. % of Y$_2$O$_3$, surface area of 5 to 9 m$^2$/g, average particle size of 0.4 micrometer, from Tosoh) were added to a glass beaker in order to form an aqueous solution of the metal salts. The citric acid addition was used to control the pH of the aqueous solution to a value of about 3. The glass beaker containing the aqueous solution was placed in an ultrasonic water bath for 20 minutes in order to ensure that the precursors were fully dissolved and well mixed. The glass beaker was subsequently uncovered and heated at 80° C. on a hot plate with a magnetic stirrer for 15 minutes after which 31.6 grams of ethylene glycol (99%, from Alfa Aesar) was added. The hot plate temperature was then increased to 150° C. and stirring continued for about 2 hours in order to evaporate the water and form a viscous mixture. The mixture was then transferred to a ceramic crucible without a cover, loaded into an electrically heated furnace and calcined in air at temperature of 850° C. (heating ramp rate of 3° C./minute, dwell at 850° C. for 3 hours, cooling rate of 3° C./minute). The resulting catalyst powder was green in color.

Table 2 shows the effects of the ratios of Ce:Al, (Ni+Rh):(Ce+Al), and YSZ:(Ce+Al) on the properties of the catalyst composites prepared according to Examples 1 to 9. Although the catalyst powders synthesized in Examples 4 and 5 both used Al$_2$O$_3$ and CeO$_2$ as oxide precursors for the catalyst composite and both were blue in color after calcining at 850° C., Example 5 has a 6% higher BET surface area than Example 4 due to the addition of the YSZ sintering stabilizer that helps suppress particle coarsening at high temperature. However, the amount of YSZ added to the catalyst composite should be controlled in order to maintain a high initial surface area, the surface area of the added YSZ powder is low (5 to 9 m$^2$/g), adding too much YSZ would reduce the overall surface area of the catalyst composite. Consistent with Examples 1 and 4, Example 6 which used aluminum nitrate and cerium nitrate as chemical precursors for the Ni aluminate spinel catalyst resulted in higher BET surface area (97 m$^2$/g at 850° C.) and lower crystallite size (4.3 nm) than was obtained for the method of Example 5 which used aluminum oxide and cerium oxide. Whilst keeping the Ni—Rh and YSZ content constant, the BET surface area of the synthesized catalyst powders reduced with increasing ratio of Ce to Al, as shown in Examples 6 to 8. Adding higher amounts of the catalytically active metals Ni and Rh (Example 9) further reduced the BET surface area and increased the crystallite size of the resulting catalyst powder.

When keeping molar ratios of (Ni+Rh)/(Ce+Al) and YSZ/(Ce+Al) constant with 17/83 and 4/96, respectively in Examples 6 to 8 and air calcined at 850° C., the molar ratio of Ce/Al was increased from 2/98 (Example 6) to 6/94 (Example 8). The ratio of $I_{CeO2}/I_{spinel}$ is close to zero for Examples 6 and 7, suggesting the absence of cerium oxides in these examples. However, ratio of $I_{CeO2}/I_{spinel}$ increased to 0.49 as Ce/Al increased to 6/94 in Example 8, indicating the presence of second phase of cerium oxides in the catalyst composite and leading to BET surface area reduction. In Example 9, the molar ratio of (Ni+Rh)/(Ce+Al) was increased to 33/67, but the ratio of $I_{CeO2}/I_{spinel}$ is close to 0.43, indicating the presence of cerium oxide.

In the Examples of 1 to 8, the ratio of (Ni+Rh)/(Ce+Al) was kept at 17/83 and excess aluminum was formed as aluminum oxide in the calcined catalyst composite product. The peak intensity ratios of $I_{spinel}/I_{spinel+Al2O3}$ in these examples were below 1.5. An additional example was also prepared (not shown in Table 2) with same ratios of Ce/Al and YSZ/(Ce+Al) as Example 6, but with stoichiometry of (Ni+Rh) to (Ce+Al) of ½, the XRD pattern (not shown) indicated absence of cerium oxide phase in the catalyst composite and the ratio of $I_{spinel}/I_{spinel+Al2O3}$ to be about 2.

Figure 5:
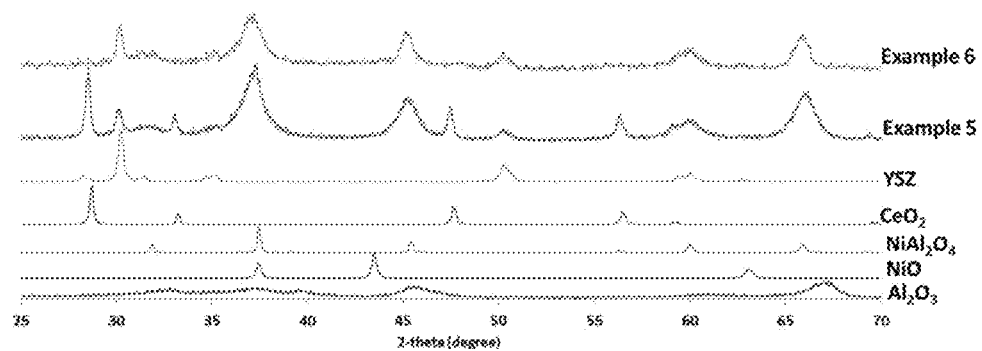
FIG. 5 shows XRD patterns of catalysts synthesized in Examples 5 and 6.
Figure 6:
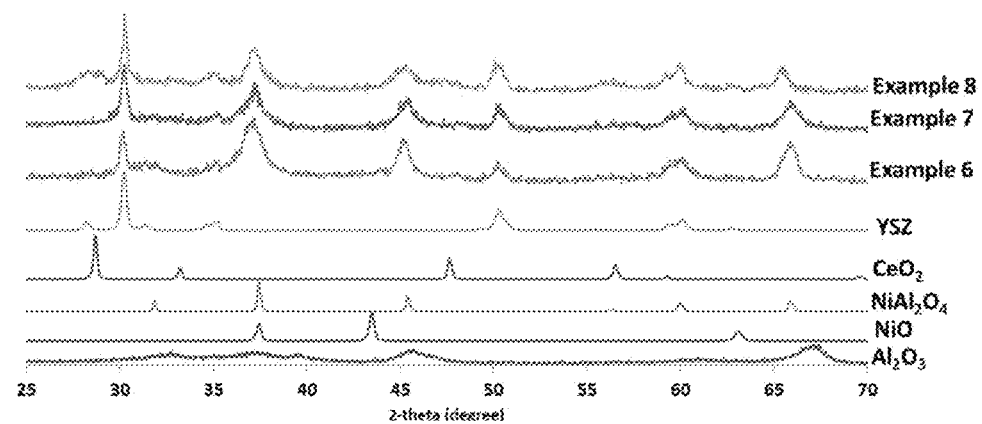
FIG. 6 shows XRD patterns of catalysts synthesized in Examples 6, 7 and 8.

FIGS. 5 and 6 show the XRD patterns of the catalyst powders synthesized by the methods of Examples 5 through 8. Even though Examples 5 and 6 have similar cerium contents (4.1 wt %) in the final calcined powder, no cerium oxide XRD peak (near 28.7 degree) was detected for Example 6 and it confirmed that the cerium formed a solid solution with the Ni aluminate spinel. This result is in agreement with the results of Examples 1 to 4. As the molar ratio of Ce to Al was increased in the catalyst powder, the intensity of XRD peaks corresponding to CeO$_2$ was also increased. These results suggest that the amount of cerium that can be formed into solid solution or doped into the nickel aluminate spinel structure becomes saturated as ratio of Ce:Al increases. Oxide particles of yttria stabilized zirconia was added to the catalyst mixtures in Examples 5 through 9 and their XRD peaks are clearly shown in the XRD results for those Examples.

Figure 7:
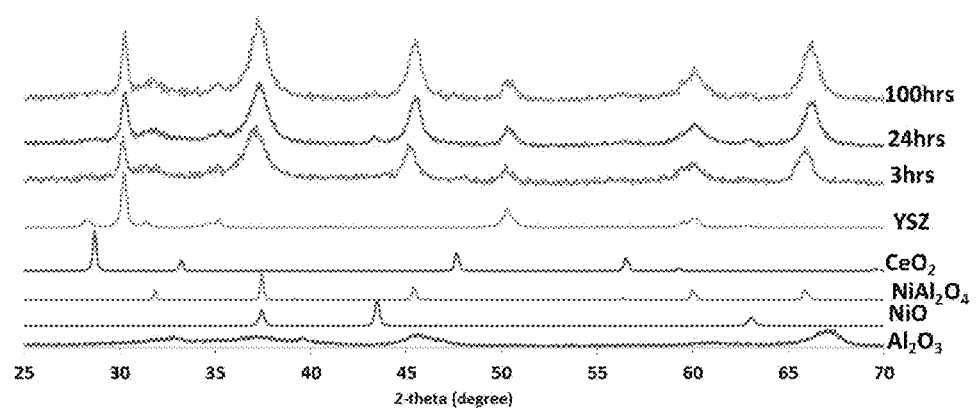
FIG. 7 shows XRD patterns of catalyst powders synthesized in Example 6, calcined at 850° C. for various periods of time.
Figure 8:
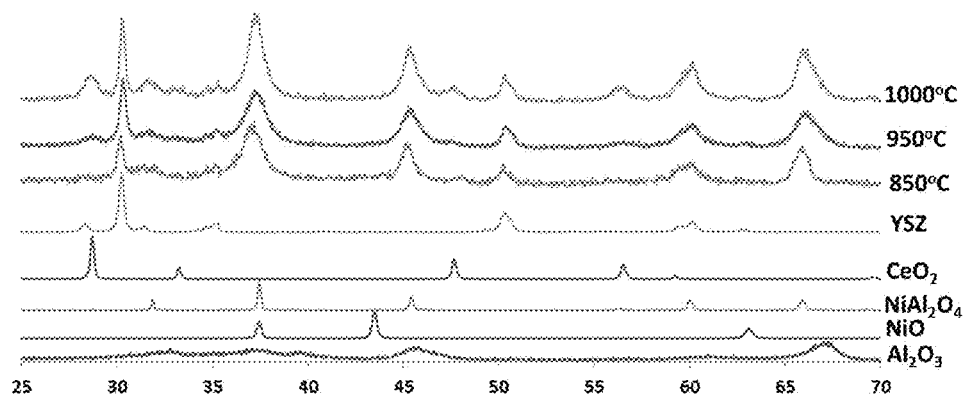
FIG. 8 shows XRD patterns of catalyst powders synthesized in Example 6, calcined at different temperatures.

FIGS. 7 and 8 show the XRD results of thermal aging tests on the catalyst powder synthesized according to the method of Example 6. FIG. 7 suggests that the crystal structure of the Example 6 catalyst did not change significantly after heating in air at 850° C. for 3 hrs, 24 hrs and 100 hrs, furthermore there are no detectable XRD peaks for CeO$_2$ after this thermal aging test. However, as the aging temperature was increased to 1000° C., it can be seen from FIG. 8 that XRD peaks corresponding to CeO$_2$ were detected, implying that cerium started to come out of solid solution with the nickel aluminate spinel under these conditions. The color of the aged catalyst powder also changed from green to blue, indicating the formation of NiAl$_2$O$_4$ spinel with cubic structure.

TABLE 2

Properties of calcined catalyst powders in Examples 1 to 9

| | | Example 1 | Example 2 | Example 3 | Example 4 | Example 5 | Example 6 | Example 7 | Example 8 | Example 9 |
|---|---|---|---|---|---|---|---|---|---|---|
| Chemical raw materials (gram) | Ni(NO3)2.6H2O | 12.8 | 12.8 | 12.8 | 12.8 | 12.5 | 12.5 | 12.5 | 12.5 | 25 |
| | Rh(NO3)3 · xH2O | 0 | 0 | 0 | 0 | 0.2 | 0.2 | 0.2 | 0.2 | 0.4 |
| | Al2O3 | 0 | 0 | 10.8 | 10.8 | 10.8 | 0 | 0 | 0 | 0 |
| | Al(NO3)3.9H2O | 79.4 | 79.4 | 0 | 0 | 0 | 79.4 | 77.9 | 76.2 | 76.2 |
| | CeO2 | 0 | 0.8 | 0 | 0.8 | 0.8 | 0 | 0 | 0 | 0 |
| | Ce(NO3)3.6H2O | 2 | 0 | 2 | 0 | 0 | 2 | 3.7 | 5.6 | 5.6 |
| | YSZ | 0 | 0 | 0 | 0 | 1.1 | 1.1 | 1.1 | 1.1 | 1.1 |
| | Ce/Al molar ratio | 2/98 | 2/98 | 2/98 | 2/98 | 2/98 | 2/98 | 4/96 | 6/94 | 6/94 |
| | (Ni + Rh)/(Ce + Al) molar ratio | 17/83 | 17/83 | 17/83 | 17/83 | 17/83 | 17/83 | 17/83 | 17/83 | 33/67 |
| | YSZ/(Ce + Al) molar ratio | 0 | 0 | 0 | 0 | 4/96 | 4/96 | 4/96 | 4/96 | 4/96 |
| Calcined powder at 850° C. | Final powder weight (gram) | 14.9 | 14.8 | 14.9 | 15.1 | 15.9 | 15.8 | 16.3 | 16.8 | 20.1 |
| | Ni wt % | 17.2% | 17.3% | 17.2% | 16.9% | 15.7% | 15.8% | 15.3% | 14.9% | 24.9% |
| | Rh wt % | 0.0% | 0.0% | 0.0% | 0.0% | 0.4% | 0.5% | 0.4% | 0.4% | 0.7% |
| | Ce wt % | 4.4% | 4.4% | 4.4% | 4.3% | 4.1% | 4.1% | 7.3% | 10.8% | 9.1% |
| | Al wt % | 38.4% | 38.6% | 38.4% | 37.9% | 35.9% | 36.2% | 34.4% | 32.7% | 27.3% |
| | YSZ wt % | 0.0% | 0.0% | 0.0% | 0.0% | 6.9% | 6.9% | 6.7% | 6.5% | 5.5% |
| BET surface area (m2/g) | Calcined temperature (degree C.) | | | | | | | | | |
| | 750 | 102 | 93 | 95 | 92 | 97 | 104 | 103 | 98 | 90 |
| | 850 | 94 | 82 | 84 | 83 | 87 | 97 | 94 | 92 | 81 |
| | 950 | 81 | 63 | 69 | 66 | 72 | 87 | — | — | — |
| | 1000 | 69 | 49 | 59 | 54 | 62 | 76 | — | — | — |
| XRD pattern (calcined at 750 C.) | Spinel crystallite size (nm) | 3.4 | 5.4 | 5.1 | 7.3 | 6.8 | 2.9 | — | — | — |
| | XRD peak intensity ratio of $I_{CeO2}/I_{spinel}$ | 0 | 3.97 | 0.72 | 3.29 | 1.61 | 0 | — | — | — |
| XRD pattern (calcined at 850 C.) | Spinel crystallite size (nm) | 5.2 | 7.3 | 6.5 | 8.6 | 7.5 | 4.3 | 4.6 | 5.5 | 8.1 |
| | XRD peak intensity ratio of $I_{CeO2}/I_{spinel}$ | 0 | 1.97 | 0.81 | 2.27 | 1.25 | 0 | 0 | 0.49 | 0.43 |
| | XRD peak intensity ratio of $(I_{spinel}/I_{spinel+Al2O3})$ | 1.03 | 1.18 | 1.21 | 1.22 | 1.38 | 1.28 | 1.45 | 1.49 | 1.98 |

Example 10 Catalytic Performance of Example 5

Fecralloy metal foil with a thickness of 150 μm was stamped in order to form a grooved pattern on the foil surface and to increase the surface roughness. The metal foil was then rolled into a monolithic structure that was used as a catalyst substrate. A more detailed description of monoliths of this type and methods for making them can be found in U.S. patent application Ser. No. 14/979,790, which is incorporated herein by reference. The Fecralloy metal substrate monolith had dimensions of 0.48 inch outer diameter, 4 inch length and porosity of about 80%. Prior to catalyst slurry coating, the substrate was oxidized in air at 950° C. for 2 hours in order to form a thin layer, a few microns thick, of aluminum oxide on the metal surface.

16 grams of catalyst powder synthesized according to the method of Example 5 and calcined at a temperature of 650° C. was dispersed in a 6 oz bottle with 64 grams of ethanol and 1 gram of dispersant agent KD-1 (Hypermer™). 250 grams of 1.5 mm diameter YSZ spherical milling media was added to the 6 oz bottle and the mixture was continuously milled for 3 hours with roller speed of 170 to 175 rpm. The average particle size of catalyst powder after milling was measured to be approximately 2.5 μm. 10 grams of binder (B-73210, obtained from Ferro Corporation), was then dissolved in 18.5% PVB and a mixture of toluene and ethanol with a ratio of 1.7 to 1 before being added to the slurry mixture and milled for an additional 1 hour. The pre-oxidized metal substrate monoliths were dip-coated with catalyst by fully immersing the substrate into the slurry. The metal substrate monoliths were held in the slurry for 10 to 15 seconds before being taken out and suspended vertically in order to drain off excess slurry. After blowing dry air at a flow rate of 50 scfh through individual monoliths for about 10 seconds, coated samples were air-dried at room temperature for 1 hour and repeat cycles of the dip-coating process can be used to obtain the desired catalyst coating weight on the metal monoliths. Two cycles of dip-coating were used in this example. After the drying step the coated monoliths were loaded into an electrically heated furnace and heated in air at 650° C. for 2 hours in order to burn off organic components and enhance adhesion of the coating, a 2° C./min heating and cooling rate was used during this procedure.

The catalyst composite powder loading on the metal substrate monoliths was determined by weighing the substrate before dip-coating and after the thermal treatment. The average catalyst composite loading on the metallic substrates was measured to be approximately 0.12 g/inch and, the loading density was calculated to be 35.7 kg/m$^3$.

12 pieces of the catalyst coated metal monoliths as prepared by the method described above were inserted in series into a 'U' shaped metal reformer tube with a total length of 51 inches. The 'U' shaped reformer was made of 800 HT NPS3/8 piping (SCH 40) with an inner diameter of 0.5 inch. Each leg of the reformer contained 6 pieces of catalyst insert in series and the reformer 'U' turn zone, formed by bending the pipe with 1 inch radius, was left empty. The effective length of catalytic reformer was therefore 48 inches. The 'U' shape reformer unit was loaded vertically in an electrically heated furnace and a feed gas mixture, 18 SLPM (standard liters per minute) of methane and 27 SLPM of steam (steam to carbon ratio of 1.5) was preheated to 650° C. prior to entering the inlet of reformer. The reformer feed gas pressure was controlled at 200 psig.

Example 11 Catalytic Performance of Example 6

Metal substrate monoliths as described in Example 10 were used and coated with catalyst as follows. 16 grams of catalyst powder synthesized according to the method of Example 6 and calcined at a temperature of 850° C. was dispersed in a 6 oz bottle with 64 grams of ethanol and 1 gram of dispersant agent KD-1 (Hypermer™). 250 grams of 1.5 mm diameter, spherical YSZ milling media was added to the slurry container and the mixture was continuously milled for 3 hours with roller speed of 170 to 175 rpm. The average particle size of the catalyst powder was measured to be approximately 2.5 m. 10 grams of binder (B-73210, obtained from Ferro Corporation), was then dissolved in 18.5% PVB and a mixture of toluene and ethanol with a ratio of 1.7 to 1 was added into the slurry mixture before milling for an additional 1 hour. The pre-oxidized metal substrate monoliths were dip-coated with catalyst by fully immersing the substrate into the slurry. Monoliths were held in the slurry for 10 to 15 seconds before being taken out and suspended vertically in order to drain off excess slurry. After blowing dry air at a flow rate of 50 scfh through individual monoliths for about 10 seconds, coated samples were air-dried at room temperature for 1 hour and repeat cycles of the dip-coating process can be used to obtain the desired catalyst coating weight on the metal monoliths. Two cycles of dip-coating were used in this example. After the drying step the coated monoliths were loaded into an electrically heated furnace and heated in air at 650° C. for 2 hours in order to burn off organic components and enhance adhesion of the coating, a 2° C./min heating and cooling rate was used during this procedure.

The catalyst composite powder loading on the metal substrate monoliths was determined by weighing the substrate before dip-coating and after the thermal treatment. The average catalyst composite loading on the metallic substrates was measured to be approximately 0.11 g/inch and the loading density was calculated to be 34.5 kg/m$^3$.

12 pieces of the catalyst coated metal monoliths as prepared by the method described above were inserted in series into a 'U' shaped metal reformer tube with a total length of 51 inches. The 'U' shaped reformer was made of 800 HT NPS3/8 piping (SCH 40) with an inner diameter of 0.5 inch. Each leg of the reformer contained 6 pieces of the catalyst insert in series and the reformer 'U' turn zone, formed by bending the pipe with 1 inch radius, was left empty. The effective length of catalytic reformer was therefore 48 inches. The 'U' shape reformer was loaded vertically in an electrically heated furnace and a feed gas mixture, 18 SLPM of methane and 27 SLPM of steam (steam to carbon ratio of 1.5) was preheated to 650° C. prior to entering the inlet of reformer. The reformer feed gas pressure was controlled at 200 psig.

TABLE 3

Catalytic performances of Examples 10 and 11

| | Catalytic performance | |
|---|---|---|
| | Example 10 Catalyst powder according to the method of Example 5 | Example 11 Catalyst powder according to the method of Example 6 |
| Catalyst composite |  |  |
| Catalyst composite loading (kg/m3 reactor volume) | 35.7 | 34.5 |
| Feeding gas fuel pressure (psig) | 200 | 200 |
| Steam to methane ratio | 1.5 | 1.5 |
| Gas hourly space velocity (hr$^{-1}$) | 17,500 | 17,500 |
| Initial catalytic performance (first 250 test hours) | | |
| Reactor outside wall temperature (° C.) | 861 | 861 |
| Reactor product gas temperature at outlet (° C.) | 855 | 854 |
| Methane conversion (%) | 70.8 | 71.3 |
| Approach to equilibrium temperature (° C.) | 4 | 1 |
| Catalytic performance after first steam purge cycle (100 hrs at 850° C.) | | |
| Reactor outside wall temperature (° C.) | 862 | 861 |
| Reactor product gas temperature at outlet (° C.) | 855 | 853 |
| Methane conversion (%) | 70.3 | 71.2 |
| Approach to equilibrium temperature (° C.) | 7 | 1 |
| Catalytic performance after second steam purge cycle (100 hrs at 900° C.) | | |
| Reactor outside wall temperature (° C.) | 866 | 861 |
| Reactor product gas temperature at outlet (° C.) | 857 | 855 |
| Methane conversion (%) | 69.3 | 71.1 |
| Approach to equilibrium temperature (° C.) | 12 | 3 |

As shown in Table 3, the catalyst coated metal monoliths of Examples 10 and 11 achieved a relatively low approach to equilibrium temperature indicating a high catalytic activity for steam methane reforming with steam to carbon ratio of 1.5. The redox stability of the catalyst samples was investigated by purging the reformer with 100% steam at 850 to 900° C. as a method of accelerating the degradation. Conventional Ni—Al$_2$O$_3$ catalysts are known to form significant amounts of catalytically inactive NiAl$_2$O$_4$ spinel under such high temperature steam purge conditions. After the high temperature steam purge cycle, the catalytic performance of Example 10 that used the catalyst powder synthesized according to the method of Example 5 had a significantly increased approach to equilibrium temperature. The approach to equilibrium temperature increased from 4 to 12° C. and at the same time methane conversion was reduced by 1.5% from 70.8% to 69.3% for the same operation conditions before and after the high temperature steam purge. The performance of the catalyst described in Example 11 using the catalyst synthesized according to method of Example 6 maintained a less than 3° C. approach to equilibrium temperature both before and after the high temperature steam purge and the methane conversion was reduced by only 0.3% as a result of the high temperature steam purge. The results with respect to the catalyst performance and particularly before and after high temperature steam purge confirm the benefits of using cerium dopants in Ni aluminate spinel catalyst composites in order to improve redox stability as compared to conventional reforming catalysts and maintain high catalytic activity.

Figure 9:
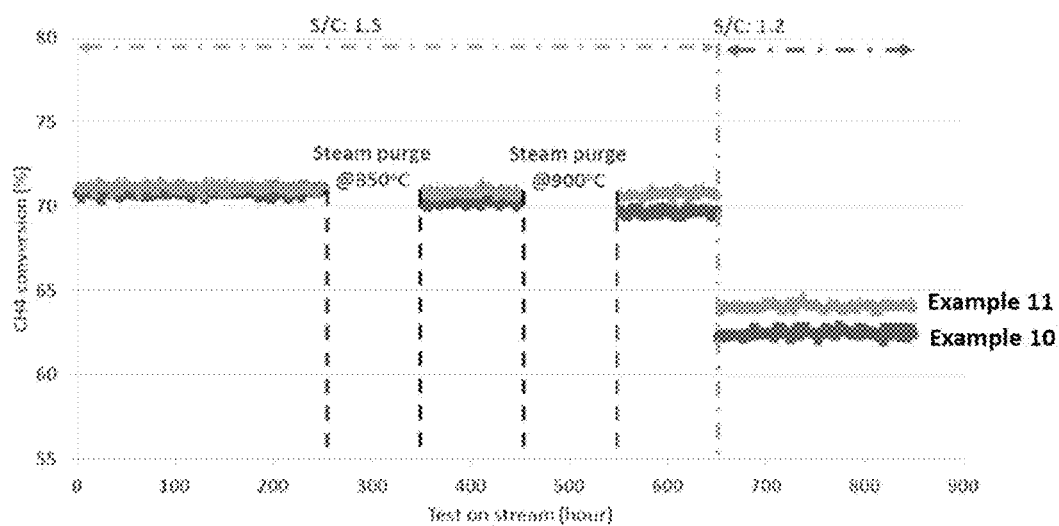
FIG. 9 shows methane conversion performance of catalysts synthesized in Examples 10 and 11.

FIG. 9 shows the catalyst performance of Examples 10 and 11 under various operating conditions. After about 650 test hours, the amount of input steam to reformer was reduced in order to adjust the steam to carbon ratio to approximately 1.2. At such a low stem to carbon ratio, conventional steam methane reforming catalysts are prone to coking or carbon formation. The addition of cerium as a dopant in the Ni aluminate spinel catalyst composites of Example 11 has resulted in a stable methane conversion under low steam to carbon condition test conditions. Overall, the catalyst of Example 10 retained close to equilibrium conversion and stable catalytic activity for the duration of the test.

We claim:

1. A Ni/spinel catalyst composite for reforming hydrocarbons comprising a spinel lattice structure, said structure of formula I:

$$[Ni_xA_{1-x}][B_y(Al)_{1-y}]_2O_4 \quad (I)$$

wherein
  A is a first metal dopant which is a precious metal dopant selected from Pt, Rh, Ru, Ir, Pd, and Au;
  x is greater than zero but less than 1.0;
  B is a second metal dopant selected from the lanthanide series or the transition metals;
  y is greater than zero but less than about 0.1;
  wherein the Ni of said composite is part of the lattice structure of said spinel, as determined by the absence of XRD peak intensity at 44.5°±0.3° and at 43.5°±0.3° for Ni and NiO, respectively,
  and wherein the peak intensity ratio (Idopant-oxide/Ispinel) is less than 0.9.

2. The catalyst of claim 1, wherein the second metal dopant (B) is part of the spinel lattice structure as indicated by the absence of the XRD peak corresponding to the oxide of the second metal dopant.

3. The catalyst of claim 1, wherein the second metal dopant (B) is Ce, and the peak intensity ratio of $I_{CeO2}$ (2-theta of 28.7°) to $I_{spinel}$ (2-theta of 37.2°) is less than 0.9.

4. The catalyst of claim 1, wherein the active metal Ni is part of the spinel lattice structure of formula I and the peak intensity ratio of the Bragg's angle 2-theta of 37.2° to the Bragg's angle 2-theta of 65.7° is less than 2.0.

5. The catalyst claim 1, wherein said second metal dopant B is selected from the group consisting of La, Ce, Ti, V, Cr, Mn, Fe, Co, Cu, Y, Zr and mixtures thereof.

6. The catalyst of claim 5, wherein said second metal dopant is derived from one or more of water soluble metal salts in form of a nitrate, chloride, acetate, oxalate, halide, sulfate and/or a hydrate thereof.

7. The catalyst of claim 5, wherein the first metal dopant (A) is Pt, Rh, and/or Ru and the second metal dopant (B) is Ce.

8. The catalyst of claim 1, wherein the Ni is present in an amount of about 5 wt % to about 33 wt % based on a total weight of the catalyst.

9. The catalyst of claim 1 which, when calcined at a temperature≥900° C., has a BET surface area of greater than 70 m²/g.

10. The catalyst of claim 9 which, when calcined at a temperature≥750° C., has a BET surface area of greater than 85 m²/g.

11. The catalyst of claim 1, wherein the atomic ratio of said second metal dopant (B) to Al ranges from about 0.1:99.9 to about 10:90.

12. The catalyst of claim 11, wherein the atomic ratio of said second metal dopant (B) to Al ranges from about 0.5:99.5 to about 6:94.

13. The catalyst of claim 1, wherein the atomic ratio of said second metal dopant (B) to Al is greater than zero, but less than about 4:96.

14. The catalyst of claim 1, wherein said catalyst contains less than about 1.0 wt % of oxides of said second metal dopant, as measured by XRD peak intensity analysis.

15. The catalyst of claim 14, wherein said catalyst contains substantially no oxides of said second metal dopant, as measured by XRD peak intensity analysis.

16. The catalyst of claim 1, wherein said catalyst has an average retained crystallite size of 10 nm or less after calcining at 850° C.

17. The catalyst of claim 1, wherein said catalyst has an average retained crystallite size of 5 nm or less after calcining at 850° C.

18. The catalyst composite of claim 1, which comprises an optional stabilizer M, wherein M is high temperature stabilizer composite oxide selected from the group consisting of YSZ, stabilized $Al_2O_3$, BaO, CaO, $La_2O_3$, ceria stabilized zirconia, $Sm_2O_3$, perovskite, hexaaluminate, pyrochlore, hydrotalcite, and mixtures thereof.

19. The catalyst of claim 18, wherein the stabilizer M is YSZ and is present in an amount of less than about 10 wt % of the catalyst composite.

20. A method of manufacturing a catalyst composite according to claim 1 for reforming hydrocarbons wherein said catalyst comprises a catalytically active amount of nickel within a spinel lattice structure, said method comprising:
  a) Mixing of salts of nickel, a first metal dopant (A), aluminum, and a second metal dopant (B) either by wet dissolving in solvent or drying mixing together;
  b) Aging the mixture prepared in step a) by either adjusting solvent pH value to about 2 to about 5, or by co-precipitation process, or by thermal treatment of salts at temperature ranged from 100 to 350° C.;
  c) Forming either viscous gel mixture by vaporizing solvents, precipitation substance, or metal salt melt; and
  d) Calcining the mixture of step c) in an oxygen environment at a temperature of from about 750 to 1200° C.,
wherein
  said first metal dopant (A) is a precious metal dopant selected from a group consisting of Pt, Rh, Ru, Ir, Pd, and Au,
  said second metal dopant (B) is selected from trivalent cations of La, Ce, Ti, V, Cr, Mn, Fe, Co, Cu, Y, Zr or mixtures thereof,
  the atomic ratio of said second metal dopant (B) to Al is greater than zero up to about 10:90.

21. The method of claim 20 wherein, said calcining is performed by combustion synthesis, flame spray pyrolysis, plasma spray, or electrically-heated furnace calcination.

22. The method of claim 20 wherein, the atomic ratio of said second metal dopant (B) to Al is in a range of from about 0.5:99.5 to about 6:94.

23. The method of claim 20 wherein, nickel is present in the final catalyst composition in an amount of from about 5 wt % to about 33 wt %, based on the total weight of the catalyst.

24. The method of claim 20 wherein, step a), the water soluble salts of said Ni, said first metal dopant (A), aluminum and said second metal dopant (B) are selected from one or more of nitrate salts, chloride salts, acetate salts, oxalate salts, halide salts, sulfate salts and/or a hydrate thereof.

25. The method of claim 20 wherein, in step b), the aqueous solution is heated to a temperature of from about 80° C. to about 100° C.

26. The method of claim 20 wherein, said calcining step is accomplished by combustion synthesis and the combustion fuel is urea, glycine, ethylene glycol, or mixtures thereof.

27. The method of claim 20 wherein, sol-gel is calcined in an atmosphere of air or oxygen containing gas at a temperature of from about 700 to about 1000° C.

28. The method of claim 20 which comprises:
a) Dissolving Ni nitrate, aluminum nitrate, rhodium nitrate and cerium nitrate in deionized water to provide an aqueous solution, while controlling pH to be in a range of from about 2 to about 5;
b) Heating the aqueous solution to a temperature of from about 80° C. to about 100° C.;
c) Adding a combustion fuel to the aqueous solution, and increasing the temperature effective to vaporize the water contained in the mixture and to form the viscous sol-gel; and
d) Calcining the sol-gel at a temperature of from about 700 to about 1000° C. to obtain the final catalyst powder, wherein the atomic ratio of Ce to Al is greater than zero, but less than about 6:94.

29. The method of claim 28 wherein, said combustion fuel is urea, glycine, ethylene glycol, or mixtures thereof.

\* \* \* \* \*